(12) United States Patent
Viger et al.

(10) Patent No.: US 12,402,152 B2
(45) Date of Patent: Aug. 26, 2025

(54) MAC/PHY INTERFACE OF WIRELESS STATIONS COMPLIANT TO DIRECT LINK AND DOWNLINK TRANSMISSIONS IN TRIGGER-BASED MULTI-USER TRANSMISSIONS

(71) Applicant: CANON KABUSHIKI KAISHA, Tokyo (JP)

(72) Inventors: Pascal Viger, Janze (FR); Stéphane Baron, Le Rheu (FR); Patrice Nezou, Liffre (FR); Julien Sevin, Saint Aubin du Cormier (FR)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 17/258,023

(22) PCT Filed: Jul. 5, 2019

(86) PCT No.: PCT/EP2019/068182
§ 371 (c)(1),
(2) Date: Jan. 5, 2021

(87) PCT Pub. No.: WO2020/011684
PCT Pub. Date: Jan. 16, 2020

(65) Prior Publication Data
US 2021/0176763 A1    Jun. 10, 2021

(30) Foreign Application Priority Data
Jul. 11, 2018   (GB) ..................................... 1811378

(51) Int. Cl.
*H04W 72/53*    (2023.01)
*H04W 72/0446*    (2023.01)
(Continued)

(52) U.S. Cl.
CPC ....... *H04W 72/53* (2023.01); *H04W 72/0446* (2013.01); *H04W 72/0453* (2013.01);
(Continued)

(58) Field of Classification Search
CPC ............. H04W 72/53; H04W 72/0446; H04W 72/0453; H04W 72/23; H04W 76/11;
(Continued)

(56) References Cited

U.S. PATENT DOCUMENTS 9,451,638 B2 *   9/2016  Azizi ................. H04W 74/0825
10,904,920 B1 *   1/2021  Noh ....................... H04W 72/04
(Continued)

FOREIGN PATENT DOCUMENTS

CN    106922034 A    7/2017
JP    2007528653 A    10/2007
JP    2014510477 A    4/2014

OTHER PUBLICATIONS

Jiseon Lee; Cheeha Kim (POSTECH); "RTS*/CTS* for UL/DL OFDMA Control"; Oct. 27, 2015; IEEE 802.11-15/1265r0; IEEE mentor; pp. 1-12.
(Continued)

*Primary Examiner* — Thuong Nguyen
(74) *Attorney, Agent, or Firm* — Canon U.S.A., Inc. IP Division

(57) ABSTRACT

Aspects of the present disclosure generally relate to enhanced multi-user (MU) uplink (UL) protocols in wireless networks that allow non-UL transmissions to be performed simultaneously with triggered MU UL transmissions. A station may send a trigger frame triggering MU transmissions with an appropriate signaling to allow non-UL transmissions, i.e. transmission to another station, in a resource unit of the MU transmission. Examples of non-UL transmissions include Direct Link transmissions as well as down-
(Continued)

link (DL) transmissions. The present disclosure regards how the MAC/PHY interface at an AP and at non-AP stations can be modified to efficiently handle the DiL and DL transmissions. On one hand, a non-AP station recipient of DiL or DL transmissions can use an 802.11ax TRIGVECTOR to efficiently configure its PHY. On the other hand, the AP can configure its PHY to filter out the DiL/DL RUs.

8 Claims, 12 Drawing Sheets

(51) Int. Cl.
  *H04W 72/0453* (2023.01)
  *H04W 72/23* (2023.01)
  *H04W 76/11* (2018.01)
  *H04W 76/14* (2018.01)
  *H04W 80/02* (2009.01)

(52) U.S. Cl.
  CPC ............ *H04W 72/23* (2023.01); *H04W 76/11* (2018.02); *H04W 76/14* (2018.02); *H04W 80/02* (2013.01)

(58) Field of Classification Search
  CPC ..... H04W 76/14; H04W 80/02; H04W 74/08; H04W 74/006; H04W 84/12; H04W 72/121
  USPC ......................................................... 370/329
  See application file for complete search history.

(56) References Cited

U.S. PATENT DOCUMENTS

| | | | | |
|---|---|---|---|---|
| 2002/0173311 A1* | 11/2002 | Biggs | ................ | H04W 74/0866 455/450 |
| 2014/0295842 A1* | 10/2014 | Choi | ................... | H04W 36/085 455/436 |
| 2015/0215914 A1* | 7/2015 | Cho | .................... | H04L 41/0816 370/235 |
| 2015/0334693 A1* | 11/2015 | Lu | ........................ | H04W 72/20 370/329 |
| 2016/0157080 A1* | 6/2016 | Agiwal | .................. | H04W 4/70 370/328 |
| 2016/0227579 A1* | 8/2016 | Stacey | .............. | H04W 74/0833 |
| 2016/0360507 A1* | 12/2016 | Cariou | ...................... | H04L 5/00 |
| 2017/0078052 A1* | 3/2017 | Matsuo | ................. | H04L 5/0037 |
| 2017/0150493 A1 | 5/2017 | Seok | | |
| 2017/0202020 A1 | 7/2017 | Cherian et al. | | |
| 2017/0257887 A1* | 9/2017 | Ghosh | ............... | H04W 74/0808 |
| 2017/0317796 A1* | 11/2017 | Lan | ...................... | H04W 72/044 |
| 2018/0076898 A1* | 3/2018 | Cho | ................... | H04W 52/0203 |
| 2018/0092036 A1* | 3/2018 | Azizi | ................... | H04W 12/069 |
| 2018/0176901 A1 | 6/2018 | Huang | | |
| 2018/0324697 A1* | 11/2018 | Cariou | ............. | H04W 52/0225 |
| 2019/0173656 A1* | 6/2019 | Takeda | ..................... | H04L 5/023 |
| 2020/0007265 A1* | 1/2020 | Min | ...................... | H04L 1/0003 |
| 2020/0177245 A1* | 6/2020 | Cariou | ................. | H04B 7/2612 |
| 2021/0176763 A1* | 6/2021 | Viger | ................. | H04W 72/0446 |
| 2023/0308328 A1* | 9/2023 | Adachi | .................. | H04L 5/0071 |
| 2023/0371075 A1* | 11/2023 | Lou | ...................... | H04W 72/541 |

OTHER PUBLICATIONS

Bo Sun; Ning Wei, Bo Zhang (ZTE Corporation); "Proposal of Spec Text Changes for TRIGVECTOR"; IEEE P802.11 Wireless LANs; Sep. 13, 2017; IEEE Mentor, pp. 1-8.

Abhishek Patil; Alfred Asterjadhi; George Cherian (Qualcomm Inc.); "Proposed resolution for comments related to Random Access AIDs for Associated and Unassociated STAs"; Mar. 9, 2017; IEEE P802.11 Wireless LANs; pp. 1-15.

Joo-Hyung Son, et al., Standardization Trends of IEEE 802.11ax Next Generation Wireless LAN, Willus Standard Technology Research Center, Oct. 2016. (Please note that a translation of a Korean Office Action that cites this reference is being submitted to meet the USPTO's requirement for submission of a "concise explanation of relvance for non-English language information" See MPEP 609. 04(a) Content Requirements for an Information Disclosure Statement [R-7]).

Bo Sun, et al., Proposal of Spec Text Changes for TRIGVECTOR, IEEE P802.11 Wireless LANs, ZTE Corporation, Sep. 2017, pp. 1-8.

LAN/MAN Standards Committee of the IEEE Computer Society: "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High", IEEE Draft; Draft P802. 11AX D3.0, IEEE-SA, XP068137527, vol. 802. llax drafts, No. D3.0, Jun. 1, 2018 , pp. 1-682, (Retrieved from the Internet on Jun. 1, 2018: URL:www.ieee802.org/11/+.

Stacey, Robert, "HE Frame Exchange Sequences", IEEE Draft, 11-17-0814-01-00AX-HE-FRAME-EXCHANGE-SEQUENCES, IEEE-SA Mentor, vol. 802. llax, No. 1, XP068116114, May 10, 2017, pp. 1-34, (Retrieved from the Internet on May 10, 17 URL:https://mentor.ieee.org/802.11/dcn/17/11-17-0814-01-00ax-he-frame-exchange-sequences.pptx).

* cited by examiner

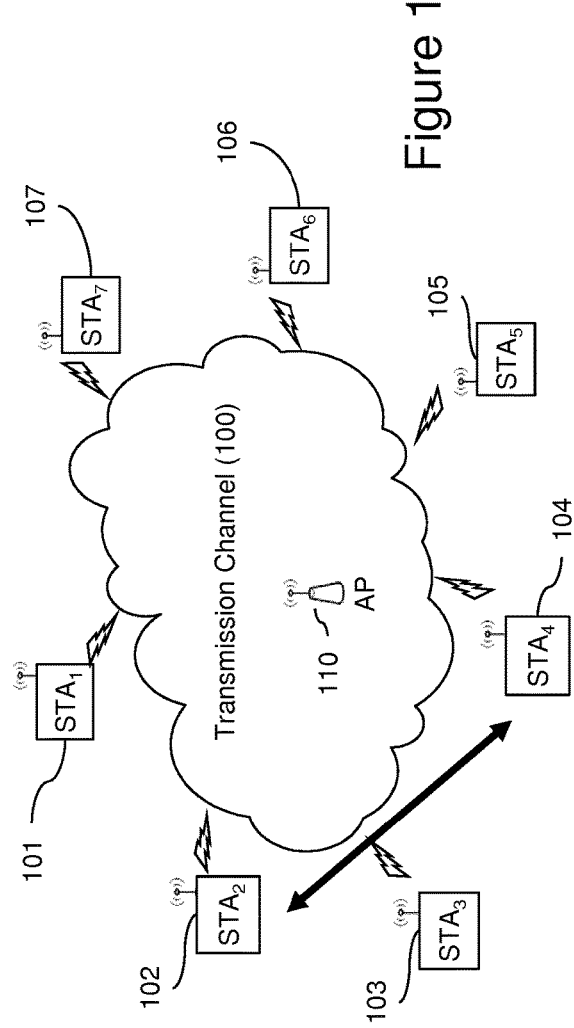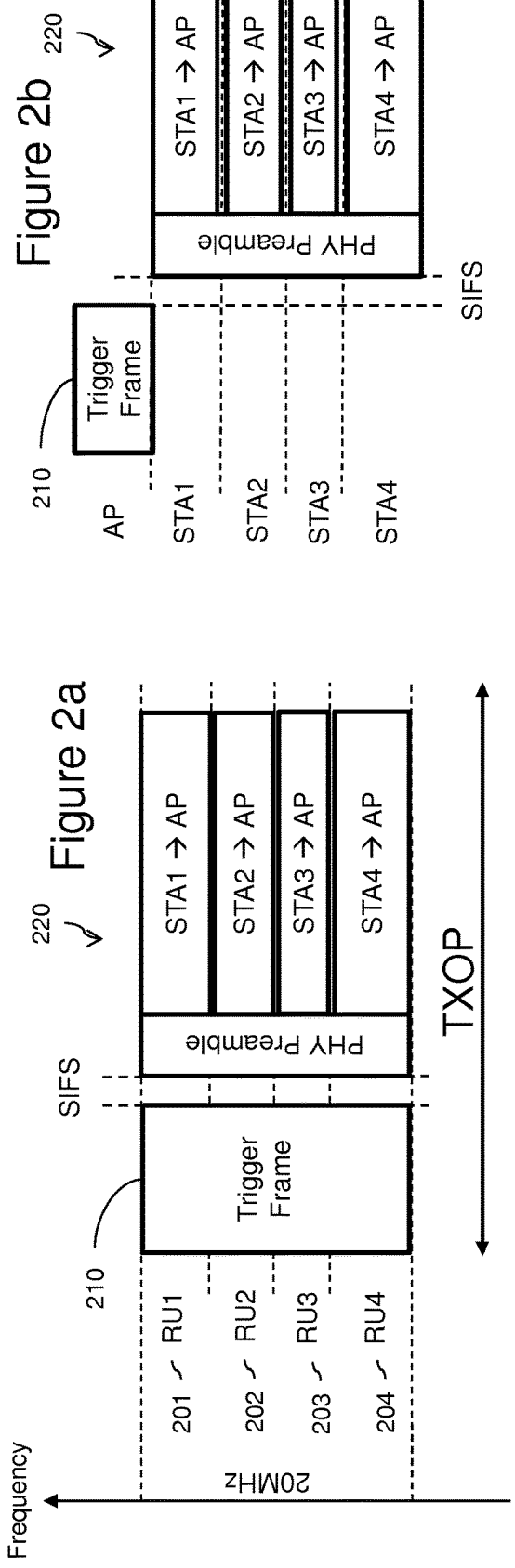
Figure 1
Figure 2a
Figure 2b

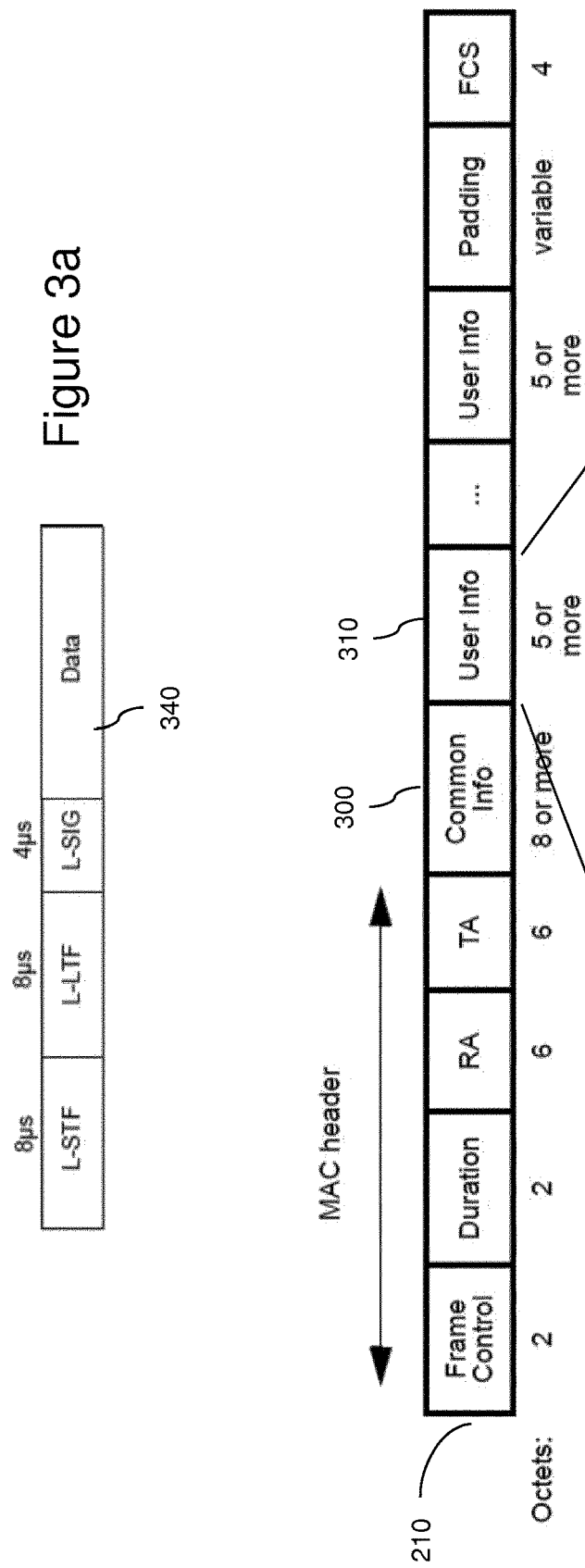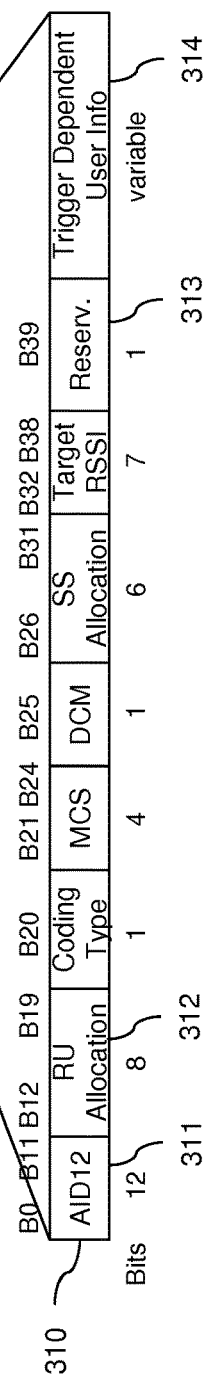

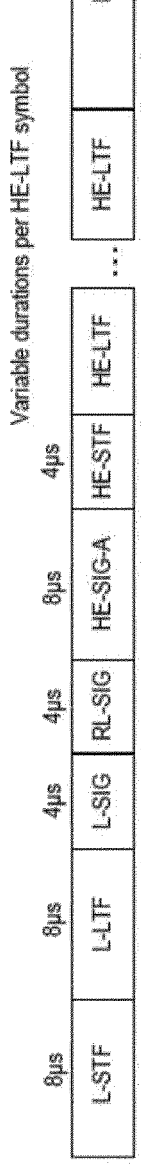
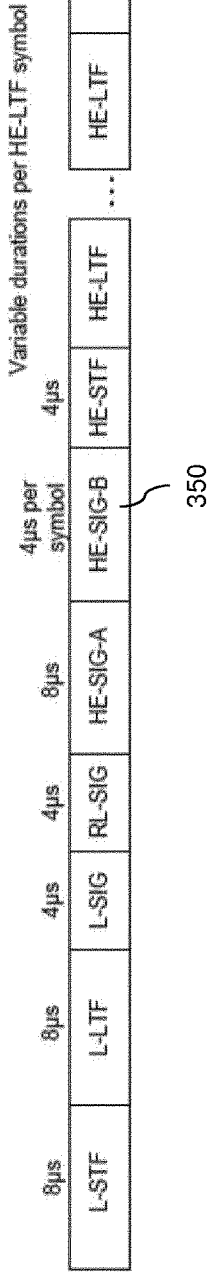
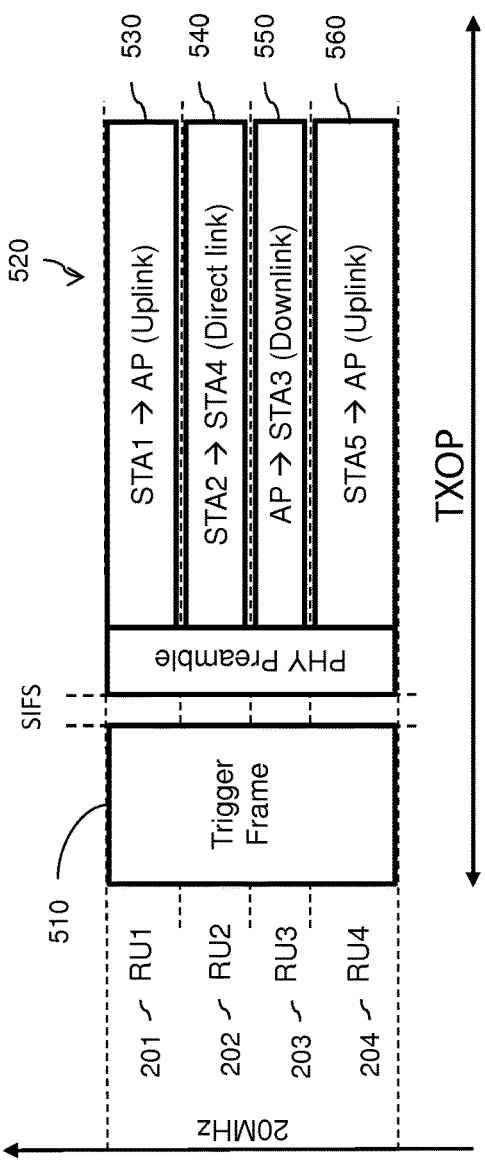

MAC/PHY INTERFACE OF WIRELESS STATIONS COMPLIANT TO DIRECT LINK AND DOWNLINK TRANSMISSIONS IN TRIGGER-BASED MULTI-USER TRANSMISSIONS

CROSS REFERENCE TO RELATED APPLICATION

This application claims the benefit under 35 U.S.C. § 119 (a)-(d) of United Kingdom Patent Application No. 1811378.7, filed on Jul. 11, 2018 and entitled "MAC/PHY INTERFACE OF WIRELESS STATIONS COMPLIANT TO DIRECT LINK AND DOWNLINK TRANSMISSIONS IN TRIGGER-BASED MULTI-USER TRANSMISSIONS". The above cited patent application is incorporated herein by reference in its entirety.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth and decreasing latency requirements that are demanded for wireless communications systems in high-density environments, multi-user (MU) schemes are being developed to allow a single access point (AP) to schedule MU transmissions, i.e. multiple simultaneous transmissions to or from non-AP stations, in the wireless network. For example, one of such MU schemes has been adopted by the Institute of Electrical and Electronics Engineers (IEEE) in the 802.11ax standard, draft version 3.0 (D3.0) of June 2018.

Thanks to the MU feature, a station has the opportunity to gain access to the wireless medium via two access schemes: the MU scheme and the conventional Enhanced Distributed Channel Access—EDCA (Single User) scheme.

The 802.11ax standard allows a MU downlink (DL) transmission to be performed by the AP where the latter can perform multiple simultaneous elementary transmissions, over so-called resource units (RUs), to various non-AP stations. As an example, the resource units split a communication channel of the wireless network in the frequency domain, based for instance on Orthogonal Frequency Division Multiple Access (OFDMA) technique. The assignment of the RUs to the stations is signalled at the beginning of the MU Downlink frame, by providing an association identifier (AID) of a non-AP station (individually obtained by each station during its association procedure with the AP) for each RU defined in the transmission opportunity.

The 802.11ax standard also allows a MU uplink (UL) transmission to be triggered by the AP, where various non-AP stations can simultaneously transmit to the AP over the resource units forming the MU UL transmission. To control the MU UL transmission by the non-AP stations, the AP sends a control frame, known as a Trigger Frame (TF), by which it allocates the resource units to the non-AP stations using 16-bit Association IDentifiers (AIDs) assigned to them upon registration to the AP and/or using reserved AIDs designating a group of non-AP stations.

The adopted 802.11ax MU transmission scheme is not adapted to bandwidth-demanding communication services, e.g. video-based services such as gaming, virtual reality, streaming applications. This is because all the communications go through the AP, thereby doubling the air time for transmission but also the number of medium accesses (and thus of medium access time).

The Single User (SU) scheme of 802.11 network protocol (still applicable in the latest 802.11ax version) allows a direct link (DiL) to be performed wherein the data (MAC) frames are addressed using the 48-bit IEEE MAC address of the destination station. However, SU and MU schemes directly compete one against the other to gain access to the wireless medium (by the AP for MU schemes, by a non-AP station for the SU scheme). In high density environments, this competition generates a large amount of undesirable collisions, thereby degrading latency and overall useful data throughput.

More generally, 802.11ax is seen as not being adapted to direct link transmissions and MU transmissions can be improved.

SUMMARY OF INVENTION

It is a broad objective of the present invention to improve this situation.

In order to take advantage of the high benefits of the transmission scheduling made by the AP in high density environments, the inventors have contemplated integrating the direct link in the global policy of the AP's scheduling. This raises some challenges.

One of these challenges regards the MAC/PHY interface in the stations (AP and non-AP), which is not adapted to handle non-UL (for instance direct link or downlink) transmissions in response to a trigger frame.

For instance, upon receiving a Trigger Frame, a non-AP station can only emit uplink trigger-based data (or UL TB PPDU) as it is not expected to receive something else. On the other hand, the AP is currently the unique addressee of the uplink trigger-based data, and so it is expected to decode the data frames of all the used RUs of the TB MU transmission.

By allowing direct link (DiL) or downlink (DL) transmissions in trigger-based RUs, an issue arises as how the destination non-AP station will be able to correctly receive and decode the DiL or DL data. Indeed, the frames in trigger-based RUs follow the so-called HE Trigger-Based PPDU format which does not provide the RU allocation information to allow the non-AP station receiving it to look up the corresponding RUs to be used in the data portion of the MU transmission. Such information is known as the HE-SIG-B field.

The present invention thus seeks to provide an improved functioning of the MAC/PHY interface of 802.11 stations when non-UL RUs are allowed in a triggered-based MU transmission.

Certain aspects of the present disclosure provide a method for wireless communication comprising, at a Medium Access Control, MAC, layer of a triggered station, usually a non-access-point station:

receiving (via PHY layer), from a triggering station, usually an access point, AP, a trigger frame triggering a multi-user, MU, transmission, wherein the trigger frame allocates a resource unit of the MU transmission for data transmission towards the triggered station, and responsive to the trigger frame, configuring a Physical, PHY, layer of the triggered station in a receive state to receive one or more data frames over the resource unit (in response to the trigger frame).

Preferred implementation is when the triggering station is an AP and the triggered stations are non-AP stations (stations having registered to the AP).

A non-AP station may thus use information provided in the trigger frame to configure itself in a receive state, contrary to the 802.11 ax standard. This allows the non-AP station to be ready to receive DiL or DL data over the added non-UL resource units.

Aspects of the invention also provide a station in a wireless network comprising a microprocessor implementing a Medium Access Control, MAC, layer and being configured for carrying out the steps of the method defined above.

Optional features of the invention are defined in the appended claims. Some of these features are explained here below with reference to a method, while they can be transposed into system features dedicated to any system according to the invention.

In embodiments, the method further comprises, at the triggered station, receiving a data frame over the resource unit. This may be DiL data from a non-AP station or DL data from the AP.

In embodiments, the method further comprises, at the MAC layer prior to configuring the PHY layer, determining from the trigger frame whether a resource unit of the MU transmission is allocated for data transmission towards the triggered station. This makes it possible for the MAC layer to decide how configuring the PHY layer.

In embodiments, configuring the PHY layer includes configured the PHY layer to frequency filter only resource unit or units allocated for data transmission towards the triggered station. This aims at focusing the PHY of the non-AP station to only the relevant RU or RUs to receive the DiL/DL data intended to it.

In embodiments, configuring the PHY layer comprises sending, by the MAC layer, a TRIGVECTOR vector according to 802.11 ax. The vector is known in 802.11ax but only at the AP side. These embodiments propose using it at the non-AP side in an inventive way in order to efficiently configure the PHY using available tools. This avoids modifying the 802.11 ax-compliant chips.

According to some embodiments, the TRIGVECTOR vector comprises a list of resource units which identifies the resource unit allocated for data transmission towards the triggered station. Again, this makes it possible to use the existing TRIGVECTOR tool.

According to an implementation, the TRIGVECTOR vector further comprises an AID12_LIST list according to 802.11ax, which list comprises only a station identifier (AID) assigned to the triggered station by an access point.

In a variant, the TRIGVECTOR vector further comprises an AID12_LIST list according to 802.11ax, which list comprises only an unused station identifier (AID) not assigned to a station by an access point.

Other aspects of the present disclosure provide a method for wireless communication comprising, at a Medium Access Control, MAC, layer of a triggered station, usually a non-access-point station:

receiving (via PHY layer), from a triggering station, usually an access point, AP, a trigger frame triggering a multi-user, MU, transmission, determining whether the trigger frame allocates a resource unit of the MU transmission for direct link, DiL, transmission from the triggering station to another triggered station, usually a destination non-AP station, responsive to a positive determining, transmitting, to a Physical, PHY, layer of the triggered station, only data labelled for DiL transmission and retrieved from local MAC transmission buffers, so that the PHY layer sends only DiL-labelled data over the resource unit allocated for direct link transmission.

The non-AP station is thus capable of differently handling usual UL RUs and newly-proposed DiL RUs.

The other aspects of the invention also provide a station in a wireless network comprising a microprocessor implementing a Medium Access Control, MAC, layer and being configured for carrying out the steps of the method defined above.

Yet other aspects of the present disclosure provide a method for wireless communication comprising, at a Medium Access Control, MAC, layer of a triggering station, usually an access point, AP:

generating a trigger frame to trigger a multi-user, MU, transmission, wherein the trigger frame allocates one or more resource units of the MU transmission for data transmission towards one or more destination triggered stations, usually a destination non-AP station, sending, via a Physical, PHY, layer of the triggering station, the trigger frame to triggered stations, usually non-AP stations, and configuring the PHY layer in a receive state to receive one or more data frames over a frequency band excluding the resource unit or units allocated for data transmission towards destination triggered stations (in response to the trigger frame).

Thanks to the configuring, the AP will not receive the DiL data exchanged directly between two non-AP stations using the newly-proposed DiL RU. It turns that the AP will not relay such DiL data on the wireless network which would cause additional processing at the non-AP stations receiving the duplicates of the same DiL data. Finally, the AP is efficiently configured to the newly-proposed scheme where DiL and DL RUs can be offered by a trigger frame.

Aspects of the invention also provide a station in a wireless network comprising a microprocessor implementing a Medium Access Control, MAC, layer and being configured for carrying out the steps of the method defined above.

Optional features of the invention are defined in the appended claims. Some of these features are explained here below with reference to a method, while they can be transposed into system features dedicated to any system according to the invention.

In some embodiments, the method further comprises, at the triggering station, receiving one or more data frames over one or more resource units of the frequency band excluding the resource unit or units allocated for data transmission towards destination triggered stations. These frames are conventional uplink data to the AP. However, thanks to the invention, only such frames can be received, excluding data frames conveyed on DiL or DL RUs In other embodiments, the method further comprises, at the MAC layer prior to configuring the PHY layer, determining, from amongst resource units splitting the MU transmission, which resource unit or units are allocated for data transmission towards destination triggered station or stations. This is for the MAC of the AP to know exactly which RU or RUs have to be filtered out by the PHY.

In yet other embodiments, configuring the PHY layer comprises sending, by the MAC layer, a TRIGVECTOR vector according to 802.11ax, which TRIGVECTOR vector comprises a list of resource units which excludes the resource unit or units allocated for data transmission towards destination triggered stations. This advantageously does not modify the MAC/PHY signaling currently defined by 802.11ax. It turns that current 802.11ax-compliant chips can still operate with the present aspects of the invention.

In a variant, configuring the PHY layer comprises sending, by the MAC layer, a TRIGVECTOR vector according to 802.11ax, which TRIGVECTOR vector comprises a list of resource units forming the MU transmission and an AID12_LIST list identifying triggered stations to which the resource units forming the MU transmission are allocated, wherein the AID12_LIST associates the resource unit or units to be excluded to an unused station identifier (AID) not assigned to a station by an access point. Similarly, this advantageously does not modify the MAC/PHY signaling currently defined by 802.11ax, playing only on the AIDs used.

Another aspect of the invention relates to a non-transitory computer-readable medium storing a program which, when executed by a microprocessor or computer system in a device, causes the device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 1 illustrates a typical wireless communication system in which embodiments of the invention may be implemented;

FIGS. 2a and 2b illustrate a conventional trigger-based (TB) MU UL OFDMA transmission according to 802.11ax;

FIGS. 3a to 3e present various formats of 802.11 frames according to the 802.11ax standard;

FIG. 5 illustrates a trigger-based (TB) Multi-User (MU) transmission that includes, in addition to conventional MU UL transmissions to the triggering station, MU transmissions directed to triggered stations;

DETAILED DESCRIPTION OF EMBODIMENTS

Figure 4A:
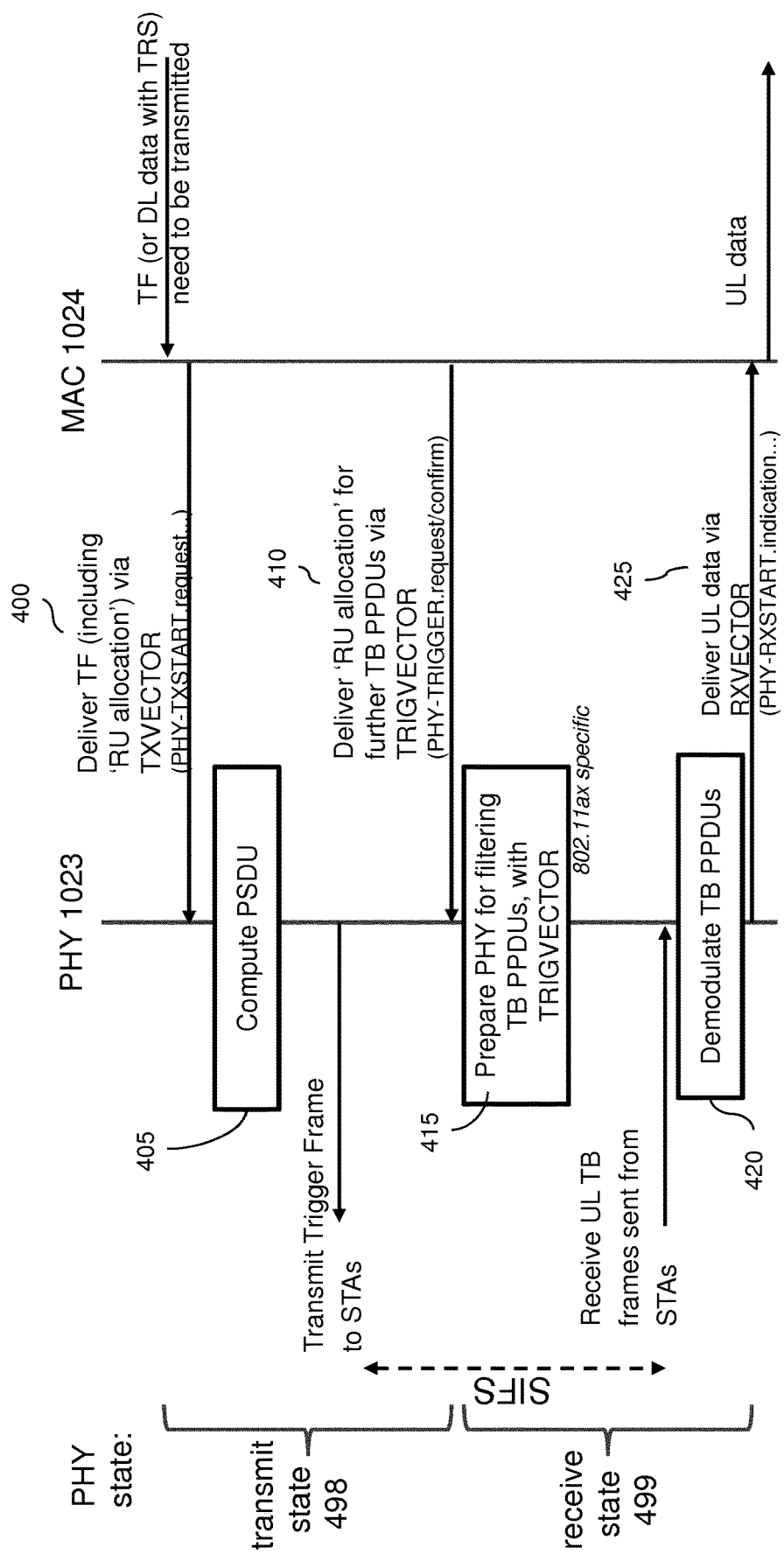
FIG. 4a illustrates, using a flowchart, conventional steps at the AP to manage the issuance of a trigger frame and the reception in response of data frames (HE TB PPDU)

Aspects of the present disclosure generally relate to enhanced multi-user (MU) uplink (UL) protocols in wireless networks that allow non-UL transmissions to be performed simultaneously with triggered MU UL transmissions. As will be described in more detail herein, a station may send a trigger frame triggering MU transmissions with an appropriate signaling to allow non-UL transmissions, i.e. transmission to another station, in a resource unit of the MU transmission. Examples of non-UL transmissions include Direct Link transmissions as well as downlink (DL) transmissions. The present disclosure regards how the MAC/PHY interface at an AP and at non-AP stations can be modified to efficiently handle the DiL and DL transmissions.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless station implemented in accordance with the teachings herein may comprise an access point (so-called AP) or not (so-called non-AP station).

An AP may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a non-AP station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

FIG. 1 illustrates a wireless communication system in which several communication stations 101-107, 110 exchange data frames over a radio transmission channel 100 of a wireless local area network (WLAN), under the management of a central station, namely access point (AP) 110 with which the stations have registered. In a variant, direct communications between stations can be implemented without the use of an access point (known as an Ad-hoc mode). The radio transmission channel 100 is defined by an operating frequency band constituted by a single channel or a plurality of channels forming a composite channel.

An exemplary wireless network is the 802.11 network according to 802.11ax D3.0 standard (published in June 2018).

Exemplary situation of direct communications, corresponding to an increasing trend nowadays, is the presence of peer-to-peer (P2P) transmissions in between non-AP stations, (e.g. WiFi-Miracast or Wireless Display scenario, or Tunneled Direct Link Setup (TDLS)). Even if such flows are not numerous, the amount of data per flow is huge (typically low-compressed video, from 1080p60 up to 8K UHD resolutions).

Each non-AP station 101-107 registers to the AP 110 during an association procedure. During the well-known association procedure, the AP 110 assigns a specific Association IDentifier (AID) to the requesting non-AP station. An AID is a 16-bit value uniquely identifying the non-AP station. According to IEEE standard, the value of an AID is assigned in the range 1 to 2007 for Directional multi-gigabit non-AP station; the 5 MSBs of the AID are reserved.

All the stations 101-107, 110 compete one against each other using EDCA (Enhanced Distributed Channel Access) contention, to access the wireless medium in order to be granted a transmission opportunity (TXOP) and then transmit data frames.

To increase wireless network efficiency, multi-user (MU) schemes are available to allow a single station, usually the AP 110, to schedule MU transmissions, i.e. multiple simultaneous transmissions to or from other stations, in the wireless network. Such a MU scheme has been adopted in 802.11ax, as the Multi-User Uplink and Downlink OFDMA (MU UL and DL OFDMA) procedures.

With reference to FIG. 2a, to actually perform such MU UL transmission, the 802.11ax standard splits a granted communication channel into resource units 201-204 (RUs) that are shared in the frequency domain by the multiple stations, based on Orthogonal Frequency Division Multiple Access (OFDMA) technique.

To finely control the MU UL transmissions by the non-AP stations 101-107, the AP 110 sends a trigger frame 210 which defines how the channel is split into RUs and which non-AP station is allowed to transmit over each RU. In this example, trigger frame 210 assigns RU 201 to STA1, RU 202 to STA2, RU 203 to STA3 and RU 204 to STA4. The assignment is made using the AIDs of the non-AP stations.

Upon reception of trigger frame 210, each non-AP station determines its assigned RU thanks to its own AID and can start transmit MU frames 220 (known as HE TB PPDU) over its assigned RU to the AP after a SIFS period after trigger frame 210.

Due to the triggering mechanism, the terms "trigger-based MU UL transmission" are used.

FIG. 2b illustrates the same MU UL transmission from station perspective.

FIGS. 3a to 3e illustrate various formats of 802.11 frames according to the 802.11ax standard, draft version 3.0.

In these various PPDU (PLCP Protocol Data Unit) formats, the Data field refers to the payload data, which contains a PSDU (PLCP Service Data Unit) from/to MAC layer. PLCP stands for Physical Layer Convergence Procedure, which is a sublayer of the PHY layer interacting with the MAC layer. Note that PSDU and MPDU terms refer to the same but from different sublayer perspectives (PSDU from PHY sublayer & MPDU from MAC sublayer). The PLCP prepares the frame for transmission by taking the frame from the MAC sublayer and creating a PPDU (by adding a preamble and PHY header to the PSDU), then modulates and transmits the data as bits.

FIG. 3a shows a non-HT (High Throughput) PPDU (Physical layer (PHY) Protocol Data Unit) format.

This format is simple as it contains a preamble made of three fields that can be understood by any station according to any version of 802.11: L-STF (Legacy Short Training Field), L-LTF (Legacy Long Training Field) and L-SIG (Legacy Signal Field) fields, followed by a Data field (if any) containing the payload data.

The L-STF and the L-LTF may be used for synchronization and channel estimation. The L-SIG may include signaling information such as length information representing a length of the entire frame and rate information.

A trigger frame, such as TF 210 is a control frame following the 802.11 legacy non-HT PPDU format. This allows all the 802.11 stations to be aware when the AP accesses the medium, to avoid collisions.

While the MAC payload 340 is basically empty for classical control frames (such as RTS or CTS frame), it is enhanced with an information structure for trigger frames.

FIG. 3b illustrates the format of the trigger frame (the Data field 340 of the non-HT PPDU) as described in section 9.3.1.23 of the 802.11ax standard, draft version 3.0, to perform MU UL OFDMA transmissions.

The trigger frame 210 contains several fields as defined in the IEEE standard 802.11ax and in particular it includes a single Common Info field 300 and a plurality of User Info fields 310.

Each User Info field 310 defines the assignment of the RUs to respective non-AP stations 101-107, as well as communication parameters to respect for UL communication with the AP. To do so, RU Allocation subfield 312 identifies the RU concerned (central frequency and frequency bandwidth), while AID12 subfield 311 carries the 12 LSBs of the AID of the non-AP station for which the RU is assigned.

Bit B39 313 of User Info field 310 is currently not used. Trigger Dependent User info subfield 314 is mainly used to provide details on communication parameters defined by the other subfields of the User Info field 310. The content of Trigger Dependent User info subfield 314 depends on the type of trigger frame. The format shown in the Figure corresponds to Trigger Dependent User info subfield 314 of a basic trigger frame.

The User Info field as defined in 802.11ax thus clearly authorizes only UL transmissions as only the source non-AP station is identified in AID12 subfield 311.

High-Efficiency (HE) frames have been introduced with 802.11ax. These frames start with the sale preamble (L-STF, L-LTF and L-SIG) readable by any station (for backward compatibility), and follows with a preamble and a Data field. The HE preamble can only be decoded by 802.11ax devices and vary according to various formats, three of which are shown in FIGS. 3c to 3e.

With reference to FIG. 3c, the HE single user (SU) PPDU format is used to carry a single PSDU to one user. It comprises, in addition to the conventional preamble (L-STF, L-LTF, L-SIG), RL-SIG (Repeated Legacy Signal Field), HE-SIG-A (HE SIGNAL A), HE-STF (HE Short Training), HE-LTF (HE Long Training field), Data and PE (Packet Extension) fields.

In the context of MU transmission, different frames are used whether it is a frame sent in response to a trigger frame (in which case it is a trigger-based PPDU) or spontaneously sent.

FIG. 3d illustrates the HE MU (Multi-User) PPDU format (HE-MU) used in 802.11ax for transmissions to one or more stations, in particular for MU downlink (DL) transmissions from the AP to non-AP stations.

The HE-MU PPDU includes the fields as HE single user (SU) PPDU, with an additional field 350, namely HE-SIG-B (HE SIGNAL B), used to tell the non-AP stations in which resource unit they will find their data. HE-SIG-B 350 thus defines how the RUs forming the DL MU transmission are assigned to the non-AP stations, for the latter to efficiently receive their own data from the AP. The structure used for such signalling is different from the one used in trigger frames as described above with reference to FIG. 3b, even if the resulting content is equivalent: an RU allocation field defines the allocated RUs (i.e. RU distribution in the TXOP) while one or more User Info fields indicates the information related to each respective RU (in the same order as provided by the RU allocation info field).

FIG. 3e illustrates the HE trigger-based (TB) PPDU format (HE_Trig) used in 802.11ax for uplink (UL) transmissions from non-AP stations to the AP, in response to a trigger frame 210. Thus this is the format used by the non-AP-stations to send their data frame 220 (FIG. 2). Each HE-Trig PPDU carries a single transmission (i.e. from one non-AP station to the AP) in response to trigger frame 510.

The HE-Trig PPDU frame format has a format quite similar to the one of HE SU PPDU, except the duration of the HE-STF field is 8 μs. In particular, it does not include an HE-SIG-B field because the RU allocation to non-AP stations has already been defined by trigger frame 210.

These various formats show that the non-AP stations may have knowledge of the RUs forming a MU transmission and of the RU allocations only through the Data payload 340 of trigger frame 210 which triggers an uplink (UL) communication or a physical preamble field (the HE-SIG-B field 350) of the HE MU PPDU used for downlink (DL) communication.

As explained with more details below with reference to FIG. 8b, a station (either AP or non-AP) comprises a Medium Access Control, MAC, controller implementing 802.11ax MAC layer 824 and a physical (PHY) controller implementing the PHY layer 823 and its physical (radio) transmission services.

The conventional interactions between the 802.11ax PHY layer and the 802.11ax MAC layer are now described with reference to FIGS. 4a and 4b. They are defined in the section "28. HE PHY specification" of the 802.11ax D3.0.

The PHY provides an interface to the MAC through an extension of the generic PHY service interface as defined in 8.3.4 of the same standard. The interface includes TXVECTOR, RXVECTOR, and PHY-CONFIG_VECTOR. Using the TXVECTOR, the MAC supplies the PHY with per-PPDU transmit parameters. Using the RXVECTOR, the PHY informs the MAC of the received PPDU parameters. Using the PHYCONFIG_VEC-TOR, the MAC configures the PHY for operation, independent of frame transmission or reception, for instance for identifying the operating or primary channel, operating channel width, etc.

FIG. 4a illustrates, using a flowchart, conventional steps at the AP to manage the issuance of a trigger frame and the reception in response of data frames (HE TB PPDU). This is typically the sequence when AP 110 initiates the sending of trigger frame 210 of FIG. 2a and then receives the TB PPDU (data frames) 220 from STA1-STA4 over the various RUs.

Initially, the MAC layer 824 is in a "transmit state" 498 and delivers a Trigger Frame to the PHY 823, via a TXVECTOR 400 using a so-called PHY-TXSTART.request primitive. Alternatively, a MAC MPDU frame carrying a triggered response scheduling (TRS) information (in a TRS Control subfield of the MAC header) can be provided as such TRS information provides similar information about RU allocation than the User Info fields 310 of a trigger frame.

The delivered frame indicates the parameters required to ensure the non-AP stations will correctly transmit to the AP their data frames (HE TB PPDU) during the MU UL transmission 220 to come. These parameters include the duration of the HE TB PPDU, RU allocation within the MU UL transmission, target RSSI and MCS to respect.

At step 405, the PHY generates the PPDU (PHY frame) based on the TXVECTOR received from the MAC. In particular, the PHY inserts the control information in the signal fields. For trigger frame 210, the PHY generates the PPDU by adding a legacy short training field (L-STF), a legacy long training field (L-LTF), a legacy signal field (L-SIG).

Trigger frame 210 so generated is transmitted by the PHY on the wireless medium 100.

Once trigger frame 210 has been sent, the PHY should prepare itself to receive the response frame from the non-AP stations to which RUs have been allocated, i.e. to receive HE TB PPDU. The preparation may in particular include configuration frequency filtering based on each RU to obtain the HT TB PPDU over each RU declared in trigger frame 210.

The HE TB PPDUs to be received do not convey the HE-SIG-B field 350 due to their format (FIG. 3e). So the PHY of the AP will not be able to prepare itself using the HE TB PPDU. It thus has to rely on AP knowledge.

As the PHY is stateless, it can even not rely on the trigger frame it has just sent.

Furthermore, as the RU allocation information defined by trigger frame 210 was included in the payload 340 of non-HT trigger frame 210, the PHY could not be able to access such information.

There is thus a need that the RU allocation to be considered for next reception be provided to the PHY by the MAC. 802.11ax standard provides the TRIGVECTOR. The TRIGVECTOR is carried in a PHY-TRIGGER.request primitive in order for the MAC to configure the PHY of AP to receive HE TB PPDU over each assigned RU. Thus, at step 410, a PHY-TRIGGER.request with a TRIGVECTOR parameter is sent that provides the PHY with the information needed to demodulate the expected HE TB PPDU responses.

Among others parameters, the TRIGVECTOR includes an AID12_LIST list which carries the 12 LSBs of the AIDs of each triggered station and an RU_ALLOCATION_LIST list which indicates the RU allocated per triggered station in the whole bandwidth.

Upon receiving the TRIGVECTOR, the PHY applies (415) the parameters as provided, thereby switching in a "receive state" 499. The PHY sends a PHY-TRIGGER.confirm primitive (not shown) to the MAC to confirm that the PHY has applied the parameters provided in the PHY-TRIGGER.request primitive.

The PHY is now ready to receive the HE TB PPDU responses.

When such a TB PPDU frame 220 is received in response to trigger frame 210, the PHY of the AP demodulates it (420).

The PHY first receives the PHY preamble of the frame and measures the received signal strength (RSS). The PHY indicates the RSS to the MAC via a so-called PHY-CCA.indication primitive.

The PHY then checks a Format field in HE-SIG-A. If the Format field indicates an HE TB PPDU, the PHY receives HE-STF for 8 µs after HE-SIG-A.

The received PSDU bits (in the payload) are then assembled into octets, decoded and provided (425) to the MAC using a series of PHY-DATA.indication(DATA) primitive exchanges. Using a so-called PHY-RXSTART.indication primitive conveying the RXVECTOR parameters, the PHY also informs the MAC of the received PPDU parameters. Finally, The PHY issues a so-called PHY-RXEND.indication to the MAC layer to terminate the PSDU transmission. Then, the PHY sets the PHY-CCA.indication (IDLE) primitive and enters an idle receive state.

Figure 4B:
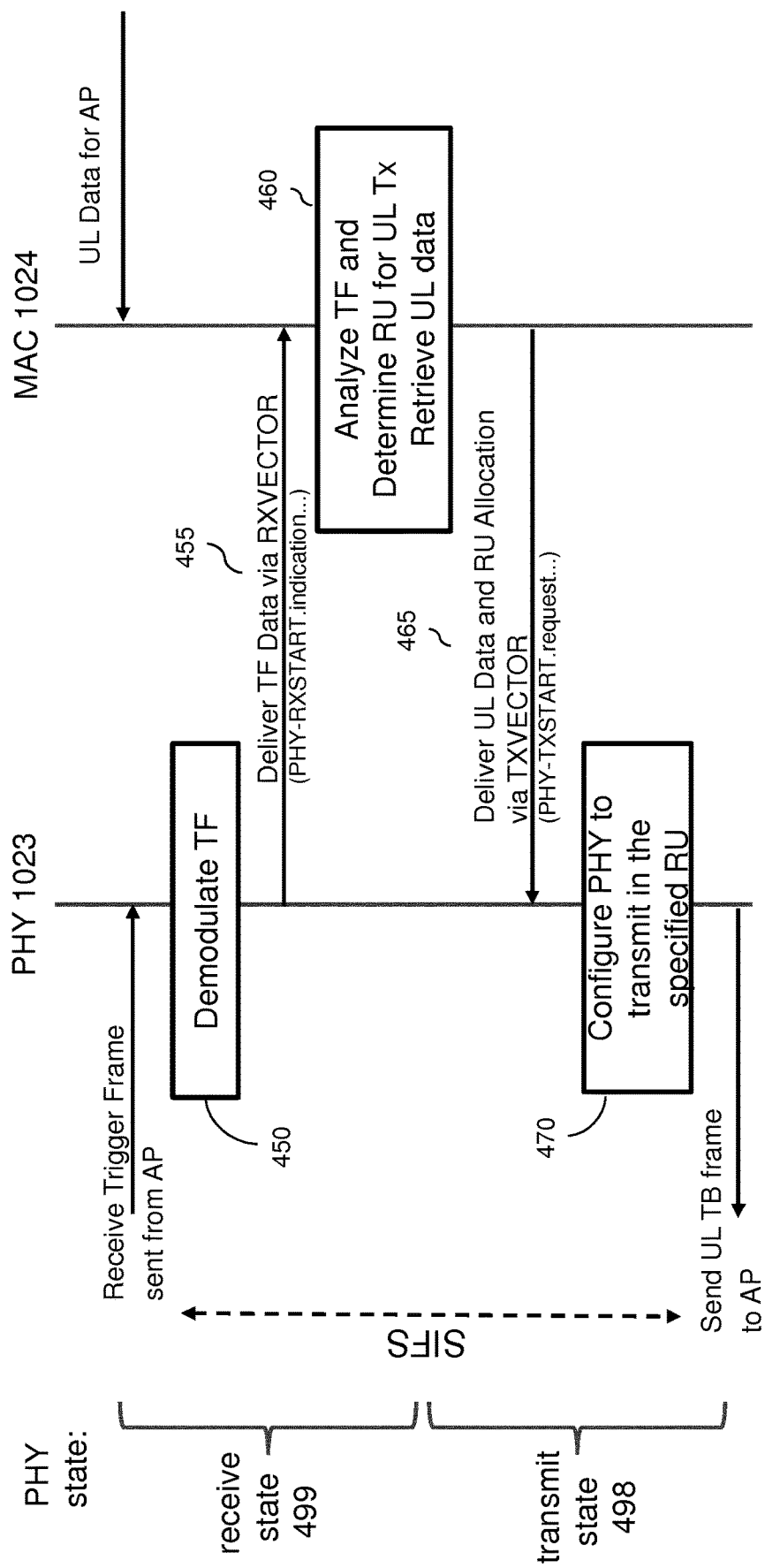
FIG. 4b illustrates, using a flowchart, conventional steps at a non-AP station to manage the reception of a trigger frame and the sending in response of data frames (HE TB PPDU) for UL transmission.

FIG. 4b illustrates, using a flowchart, conventional steps at a non-AP station to manage the reception of a trigger frame and the sending in response of data frames (HE TB PPDU) for UL transmission. This is typically the sequence when one of STA1-STA4 receives trigger frame 210 of FIG. 2a and then transmits a TB PPDU (data frames) 220 to AP 110 over an allocated RU.

Upon receiving trigger frame 210, the PHY (in receive state 499) of the non-AP station demodulates (450) it with the information of the legacy preamble and passes (455) the payload 340 (which forms the content of the trigger frame as shown in FIG. 3b for instance) directly to the MAC entity (520). The transmission from PHY to MAX uses the same primitives as described above for the AP in receive state: PHY-DATA.indication(DATA) primitive exchanges to forward the PSDU bits; PHY-RXSTART.indication primitive to convey the RXVECTOR parameters; PHY-RXEND.indication to terminate the PSDU transmission; and PHY-CCA.indication (IDLE) primitive to enter the idle receive state.

Each of the non-AP stations identified as recipient of the RU Allocation specified inside trigger frame 210 has to initiate the UL transmission after reception of trigger frame 210. The MAC of the non-AP station thus determines (460), from the trigger frame as received from the PHY, whether a RU is allocated to it for further UL transmission. The MAC then retrieves the appropriate amount of data (given the length of the UL transmission as specified in trigger frame 210) from the MAC transmission buffers. As example, random access procedure can be executed if the station is not explicitly scheduled inside the Allocation information of trigger frame 210. It is to be noted that the MAC transmission buffers of the non-AP station store both Direct link data (i.e. intended to a non-AP station) and UL data (intended to the AP), so that any of these data is retrieved for UL transmission (based on a FIFO basis).

The MAC then generates (465) a PHY-TXSTART.request (TXVECTOR) primitive, which causes the PHY to enter the transmit state 498. The PHY applies (470) the TXVECTOR parameters to configure itself to operate at the appropriate RU frequency.

The data (PSDU) to transmit (to form the HE TB PPDU 220 to send) are exchanged between the MAC and the PHY through a series of PHY-DATA.request (DATA) primitives issued by the MAC and PHY-DATA.confirm primitives issued by the PHY. The PSDU transmission is terminated upon receiving a PHY-TXEND.request primitive issued by the MAC.

The PHY then generates the HE TB PPDU (PHY frame) by adding the appropriate headers (L-STF, L-LTF, L-SIG, RL-SIG, HE-SIG-A and HE-STF) to the data received from the MAC, and then transmits the HE TB PPDU on the wireless medium 100. When the transmission is completed, the PHY enters the receive state 499.

In order to further address the issue of increasing bandwidth and decreasing latency requirements that are demanded for wireless communications systems in high-density environments, aspects of the invention seek to efficiently vary the transmissions allowed in a triggered MU transmission. Aspects of the invention provide features allowing Direct Link (DiL) transmissions and/or Downlink (DL) transmissions to be scheduled in a MU transmission by using an enhanced trigger frame. To that end, the trigger frame sent by the triggering station (usually an AP) to triggered stations (usually non-AP stations) is enhanced into a trigger frame allocating a resource unit of the MU transmission for data transmission to one or more triggered stations, usually a destination non-AP station.

A station receiving the trigger frame is referred to as triggered station, while the station sending the trigger frame is referred to as triggering station.

The newly proposed trigger frame offers Direct Link (DiL) and/or Downlink (DL) transmission capabilities within the triggered MU transmission, in addition to Uplink (UL) capabilities.

An uplink MU transmission is defined as a MU transmission from a non-AP station to the AP.

A Downlink MU transmission is defined as a MU transmission from the AP to one or more (non-AP) stations.

A Direct Link (DiL) MU transmission is defined as a MU transmission from one non-AP station to one or more other non-AP stations.

Although the triggering station may be any of stations 101-107, 110, the examples provided below mainly concentrate on the AP 110 as the triggering station and non-AP stations 101-107 as the triggered stations. Of course other configurations may be implemented where the AP is a triggered station and one non-AP station is the triggering station. Another configuration may comprise a first AP as the triggering station and a second AP as one of the triggered stations (this remote AP acting as a non-AP station with regards to the present Trigger Frame).

As will be described in more detail herein, a triggered station may then send a data frame directly to a destination triggered station using the resource unit allocated, by the trigger frame, for direct link transmission towards that destination triggered station. This implements the Direct Link (DiL) capability offered during the triggered MU transmission, from a DiL source triggered station perspective.

Also, another triggered station may then receive a data frame over the resource unit allocated for data transmission towards the triggered station. This implements the Direct Link capability from DiL destination station perspective or the Downlink capability when the data frame come from the AP.

Below, DiL RU refers to a resource unit so allocated for Direct Link transmission; DL RU refers to a resource unit allocated for Downlink transmission; and DiL/DL RU refers to a resource unit allocated for Direct Link or Downlink transmission.

FIG. 5 illustrates a trigger-based (TB) Multi-User (MU) transmission that includes, in addition to conventional MU UL transmissions to the triggering station (the AP), MU transmissions directed to triggered stations (one or more non-AP stations).

In this example, the MU transmission 520 triggered by trigger frame 510 contains conventional uplink MU frames 530, 560 over RU 201 (from non-AP STA1 to AP 110) and RU 204 (from non-AP STA5 to AP 110), downlink (DL) MU frames 550 over DL RU 203 (from AP 110 to non-AP STA3) and Direct Link (DiL) MU frames 540 over DiL RU 202 (from non-AP STA 2 to non-AP STA 4). More generally, the number of DL RUs may vary, as well as the number of DiL RUs. In embodiments, there may be only DL RUs in addition to conventional UL MU RUs or only DiL RUs in addition to conventional UL MU RUs.

Trigger frame 510 conveys the signaling of such DiL/DL MU resource units. Then, upon reception of the trigger frame, the triggered stations (here non-AP stations) are able to determine whether they are allocated a resource unit for DiL or DL transmission, and in the affirmative which resource unit either to transmit or to receive.

Various implementations of the signaling of DiL or DL RUs may be used. For instance, the DiL/DL purpose and the source and destination AIDs may be encoded, within a User Info field 310 corresponding to a given RU, using one or more of AID12 subfield 311, reserved bit B39 313 and Trigger Dependent User Info subfield 314.

In this scenario, the PHY of STA4 should remain in the receive state 499 to be able to receive the HE TB PPDU from STA2. However, conventional 802.11 ax PHY cannot operate in such a way where received state 499 is followed by transmit state 498.

Also, STA2 should only retrieve DiL data from its MAC transmission buffers. However, conventional 802.11ax PHY is not configured to do so.

Finally, AP 110 should not listen to RU2 and receive the DiL between STA2 and STA4, otherwise it would relay these data to STA4, thereby creating duplicates thereof and bandwidth loss. However, conventional 802.11ax PHY of an AP is only configured to listen to all RUs that it has triggered.

More generally, the 802.11ax PHY/MAC interfaces in the stations (AP and non-AP) are not adapted to handle non-UL (for instance direct link or downlink) transmissions in response to a trigger frame.

Aspects of the invention provides an AP which, responsive to a trigger frame with non-UL RU or RUs it sends, configures its PHY layer in a receive state to receive one or more data frames over a frequency band excluding the resource unit or units allocated for non-UL transmission, i.e. for data transmission towards destination (non-AP) triggered stations. This avoids the AP to receive the DiL data that are directly sent between non-AP stations and then to route these DiL data anew to the destination non-AP stations. Processing is thus reduced at the AP while no duplicate of the same DiL data is received at the destination non-AP stations (which could create conflict and would create additional processing at those stations).

Figure 6B:
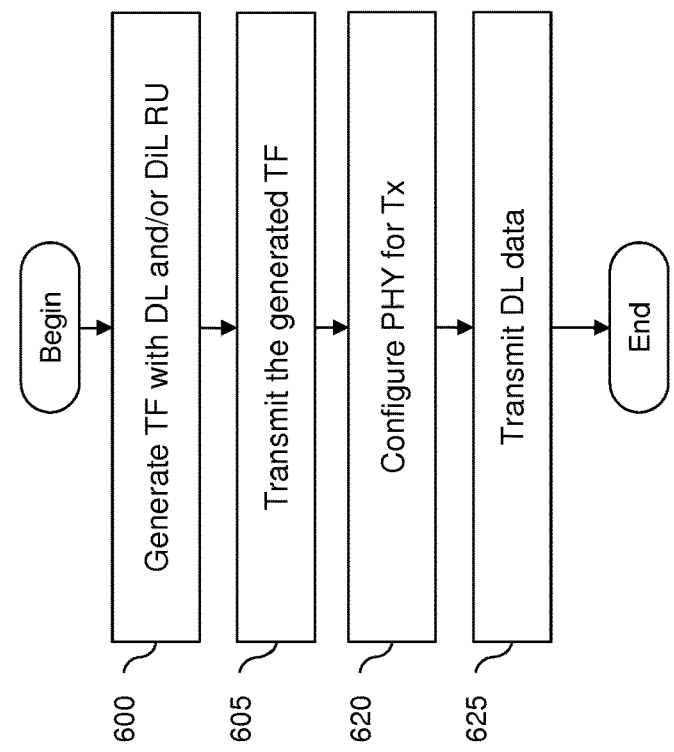
FIGS. 6a and 6b illustrate, using flowcharts, operations performed at the AP, according to various embodiments.
Figure 6A:
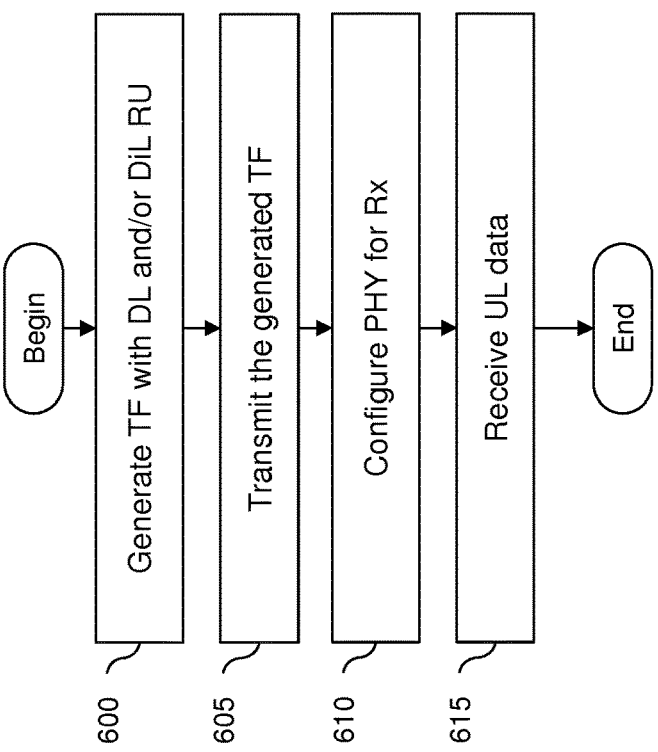

FIG. 6a illustrates, using a flowchart, general steps performed by the triggering (here AP) station.

At step 600, the AP generates a trigger frame 510 to trigger a multi-user, MU, transmission. As introduced above, the trigger frame 510 allocates a resource unit of the MU transmission for data transmission to a destination triggered station, usually a destination non-AP station. In particular, AP 110 may declare the DiL/DL RU with the destination non-AP station and, when required (for DiL), the source non-AP station using AID12 subfield 311, reserved bit B39 313 and/or Trigger Dependent User Info subfield 314.

Conventional UL resource units may also be provided by the trigger frame 510 in the MU transmission.

Decision to include such DiL or DL resource unit in the next MU transmission may be based on various criteria at the AP, for instance based on previous Buffer Status Reports received from the non-AP stations or on AP's internal buffer queues. In a variant, a RU (for DL or DiL purpose) may be allocated periodically.

For efficiency purposes, DL RUs and scheduled RUs (i.e. those for which the source station is known) for UL or DiL are preferably declared in the trigger frame before random RUs (source station not known—the stations access to such RUs through contention) for UL or DiL transmissions. This allows a non-AP station to know if it has a RU allocated for it before attempting to contend for access to a random RU either for UL or DiL transmission.

Note the order of RU declaration is the order of corresponding User Info fields 310 in the trigger frame.

At step 605, the trigger frame 510 is sent, by the PHY of the AP, to triggered stations, usually non-AP stations.

Next, at step 610, the PHY of AP 110 is configured in a receive state 499 to receive one or more (UL) data frames over a frequency band (e.g; 20 MHz band) excluding the resource unit or units allocated for (DiL, DL) data transmission towards destination triggered stations.

Figure 7A:
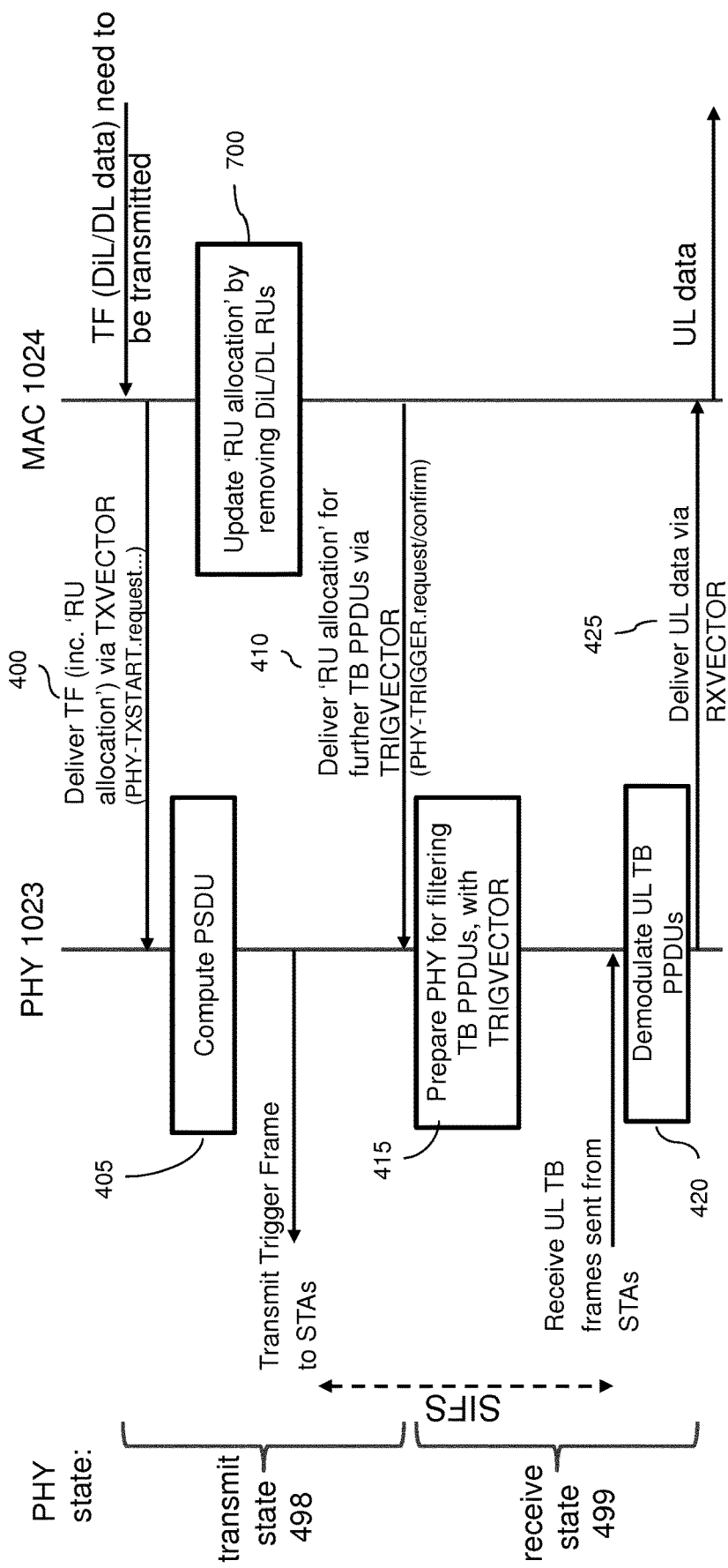
FIG. 7a, based on FIG. 4a, illustrates, using a flowchart, steps at the AP to manage the issuance of a trigger frame and the reception in response of data frames (HE TB PPDU) according to embodiments of the invention.

Details of these steps are provided with reference to FIG. 7a.

Next, at step 615, AP 110 receives one or more (UL) data frames over one or more resource units of the frequency band excluding the resource unit or units allocated for data transmission towards destination triggered stations. These data frames are conventional UL data transmitted by triggered stations. In this scheme all the DiL/DL RUs are deleted from the band filtered by the PHY. Of course, suboptimal configuration may include filtering out only part of the declared DiL/DL RUs FIG. 7a is based on FIG. 4a and illustrates, using a flowchart, steps at the AP to manage the issuance of a trigger frame and the reception in response of data frames (HE TB PPDU) according to embodiments of the invention. The same reference as those of FIG. 4a correspond to the same steps (e.g. steps 400-420).

New step 700 occurs at the MAC 824 prior to step 410 and uses the TRIGVECTOR to configure the PHY 823.

Before, the MAC 824 has prepared the trigger frame by choosing which RUs to allocate for downlink/direct-link and which RUs to keep for conventional uplink. Step 700 is in charge of removing (from usual list) the RUs dedicated for downlink/direct-link when configuring the PHY 823. To perform such removing, the MAC 823 first determines, from amongst resource units splitting the MU transmission, which resource unit or units are allocated for data transmission towards destination non-AP station or stations.

Once these DiL/DL RUs are known by the MAC, they can be excluded from the frequency band the PHY has to filter. This can be done by setting the TRIGVECTOR accordingly, i.e. the TRIGVECTOR only keeps scheduling information for uplink traffic, and not for DiL/DL RUs.

Given the structure of such vector, the TRIGVECTOR vector may comprise a list of resource units which excludes the resource unit or units allocated for data transmission towards destination non-AP stations. In other words, only the UL RUs may be listed in the TRIGVECTOR vector.

In a variant, the TRIGVECTOR vector may comprise a list of resource units forming the MU transmission and an AID12_LIST list identifying triggered stations to which the resource units forming the MU transmission are allocated. In this variant, the AID12_LIST associates the resource unit or units to be excluded to an unused station identifier (AID) not assigned to a station by an access point (during association procedure). For instance, the DiL/DL RUs the AP has to filter out may be identified with an AID value set to 2046 (in the AID12_LIST) instead of the original AID.

The TRIGVECTOR vector thus does not list the DiL/DL RUs or associates them with an unallocated RU, e.g. 2046, for the PHY to easily determine only the Uplink RUs.

The TRIGVECTOR vector is transmitted to the PHY 823 at step 410 already described. This allows the PHY to be appropriately configured to now filter out the TB PPDUs from the DiL/DL RUs (the PHY will thus not receive anything on those RUs).

Not performing new step 700 can be detrimental to the wireless network. Indeed, if not performed, the TB PPDUs received on the DiL/DL RUs would be received by the PHY and provided up to the MAC. As these MPDUs are not intended to the AP, the latter (through its MAC) will act as a relay and queue them for further delivery to the intended destination non-AP stations (this is the layer-2 bridging mechanism). A further delivery would be costly and wasteful, as the destination non-AP stations have already received the same data.

One may note that if AP 110 has two or more radio and antenna systems, it may simultaneously receive and transmit. In that case, the corresponding PHY of AP 110 is configured to send one or more (DL) data frames over the appropriate resource unit or units allocated for DL data transmission towards destination non-AP stations (step 620 in FIG. 6b).

Next, at step 625, AP 110 transmits DL data retrieved from local transmission buffers to the destination non-AP stations over the DL RUs.

Figure 7B:
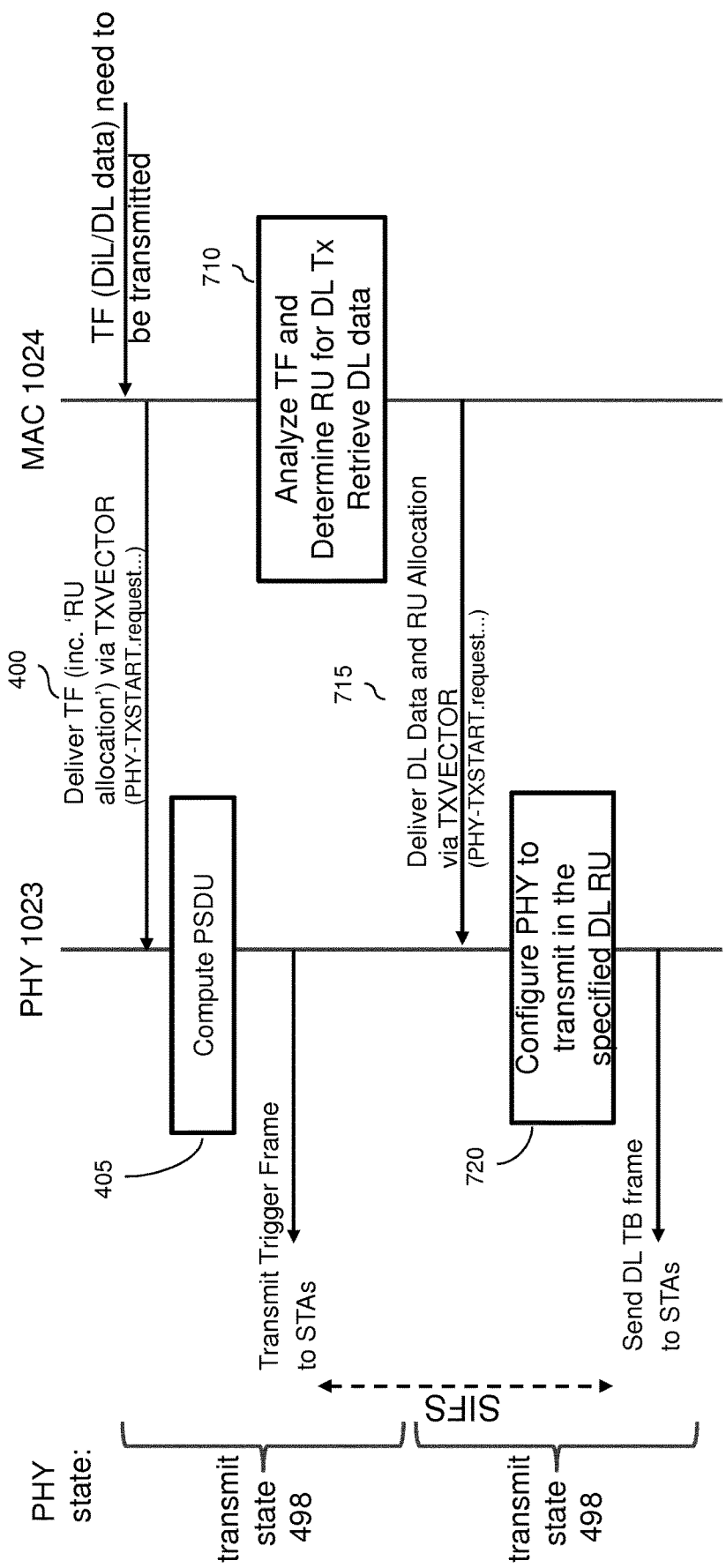
FIG. 7b, based on FIG. 4a, illustrates, using a flowchart, steps at the AP to manage the issuance of a trigger frame and the sending of downlink data frames (HE TB PPDU) to non-AP stations according to embodiments of the invention.

In details (FIG. 7b), the MAC determines, from amongst resource units splitting the MU transmission, the resource unit or units allocated for DL transmission towards destination non-AP station or stations. If any, it then retrieves corresponding DL data from its transmission buffer. This is step 710.

The MAC then generates (715) a PHY-TXSTART.request (TXVECTOR) primitive, which causes the PHY of the corresponding radio and antenna system to remain or enter the transmit state 498. The PHY then applies (720) the TXVECTOR parameters to configure itself to operate at the appropriate RU frequency.

The DL data (PSDU) to transmit are exchanged between the MAC and the PHY through a series of PHY-DATA.request (DATA) primitives issued by the MAC and PHY-DATA.confirm primitives issued by the PHY. The PSDU transmission is terminated upon receiving a PHY-TXEND.request primitive issued by the MAC.

The PHY then generates the HE TB PPDU (PHY frame) by adding the appropriate headers (L-STF, L-LTF, L-SIG, RL-SIG, HE-SIG-A, HE-STF and HE-LTF) to the data received from the MAC, and then transmits the HE TB PPDU forming the DL data, on the wireless medium 100.

Figure 7C:
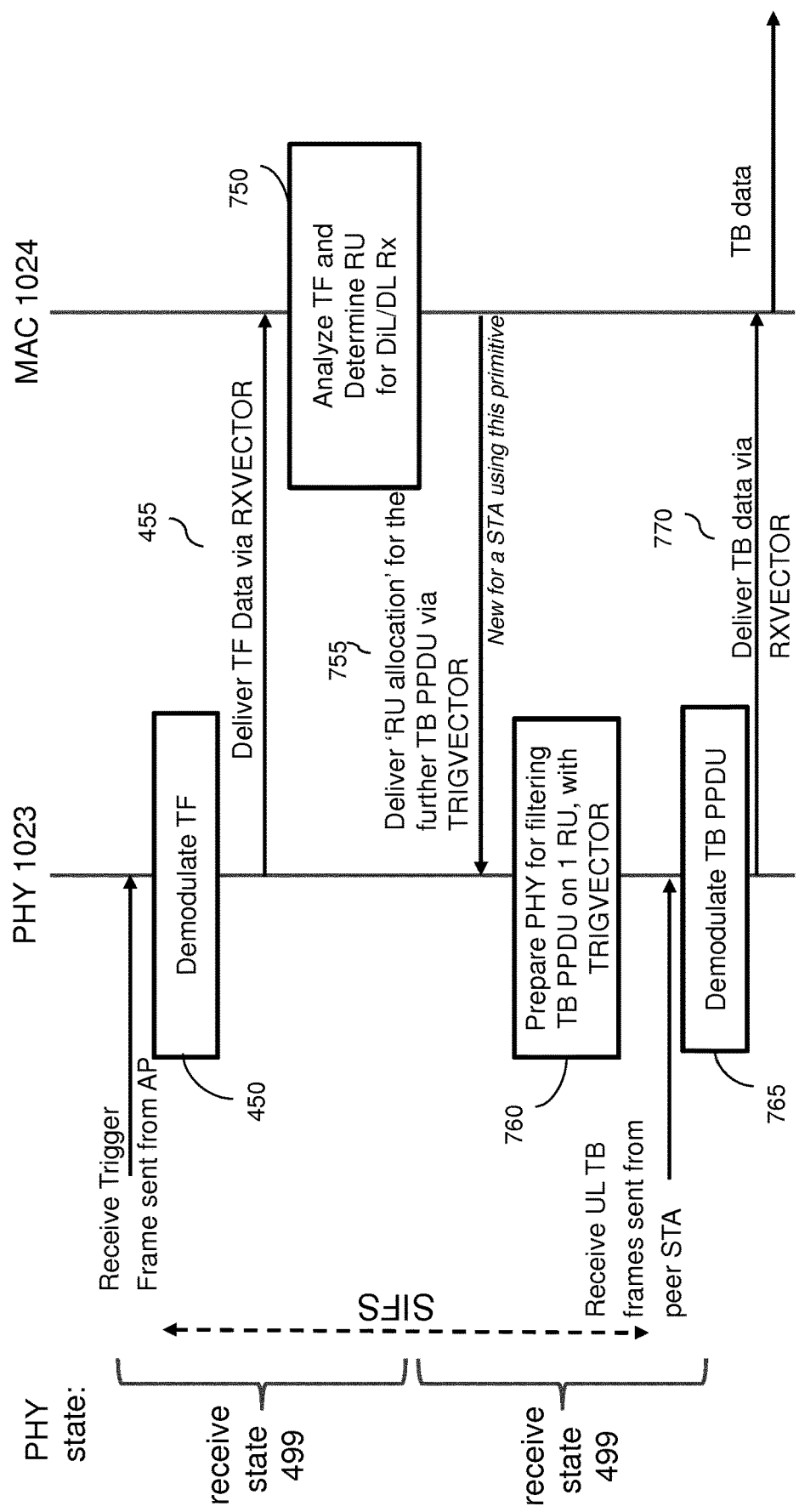
FIG. 7c, based on FIG. 4b, illustrates, using a flowchart, steps at a non-AP station to manage the reception of a trigger frame and the following reception of DiL or DL data frames (HE TB PPDU) according to embodiments of the invention.
Figure 7D:
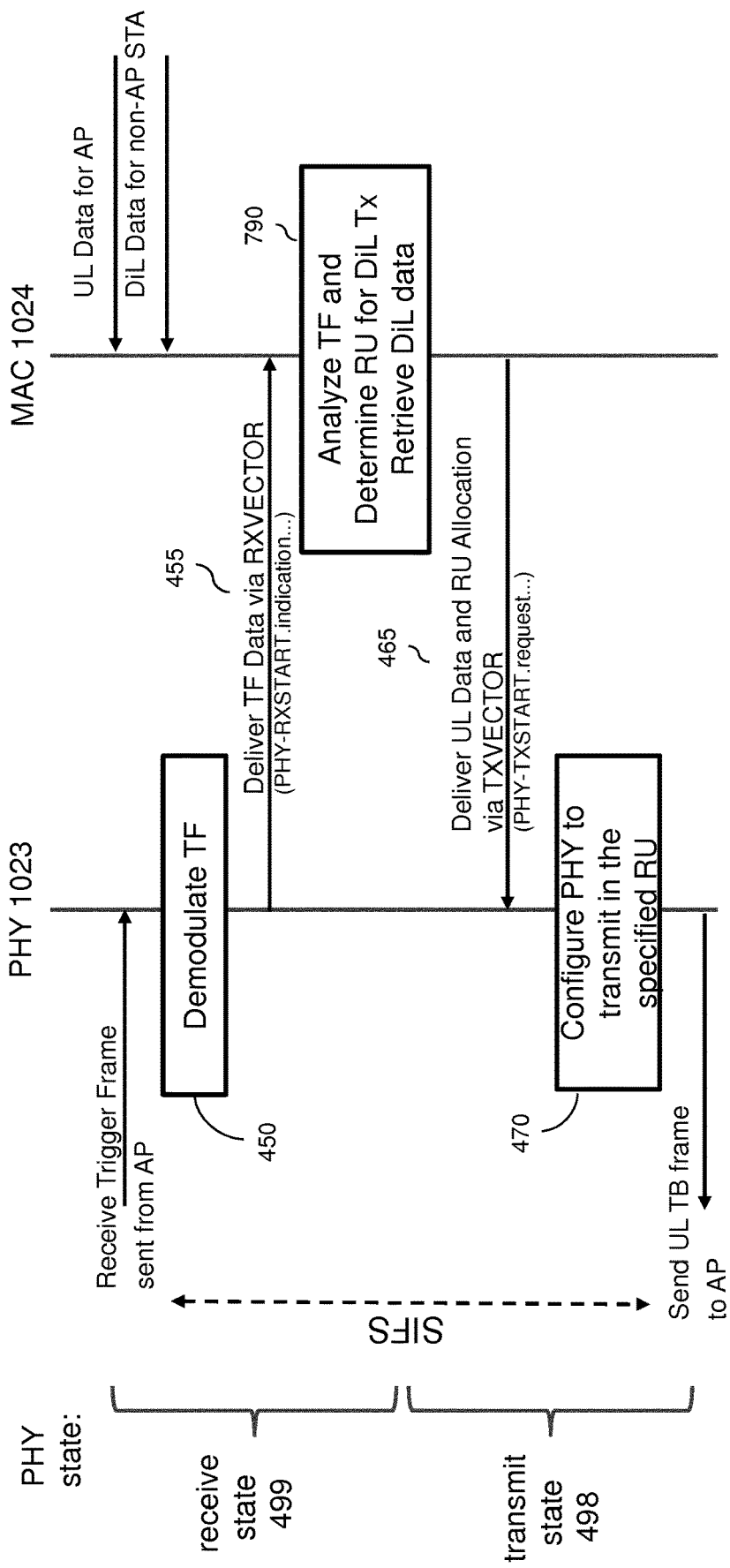
FIG. 7d, based on FIG. 4b, illustrates, using a flowchart, steps at a non-AP station to manage the reception of a trigger frame and the following sending of DiL data frames (HE TB PPDU) to another non-AP station according to embodiments of the invention.

Turning now to the behaviours at the non-AP stations, FIGS. 7c and 7d are based on FIG. 4b and illustrate, using flowcharts, steps at a non-AP station to manage the reception of a trigger frame and either the responsive sending of data frames (HE TB PPDU) for DiL transmission (FIG. 7d) or the responsive reception of data frames (HE TB PPDU) from DiL transmission (FIG. 7c) according to embodiments of the invention. The management of conventional UL transmission is described in FIG. 4b above.

Figure 6C:
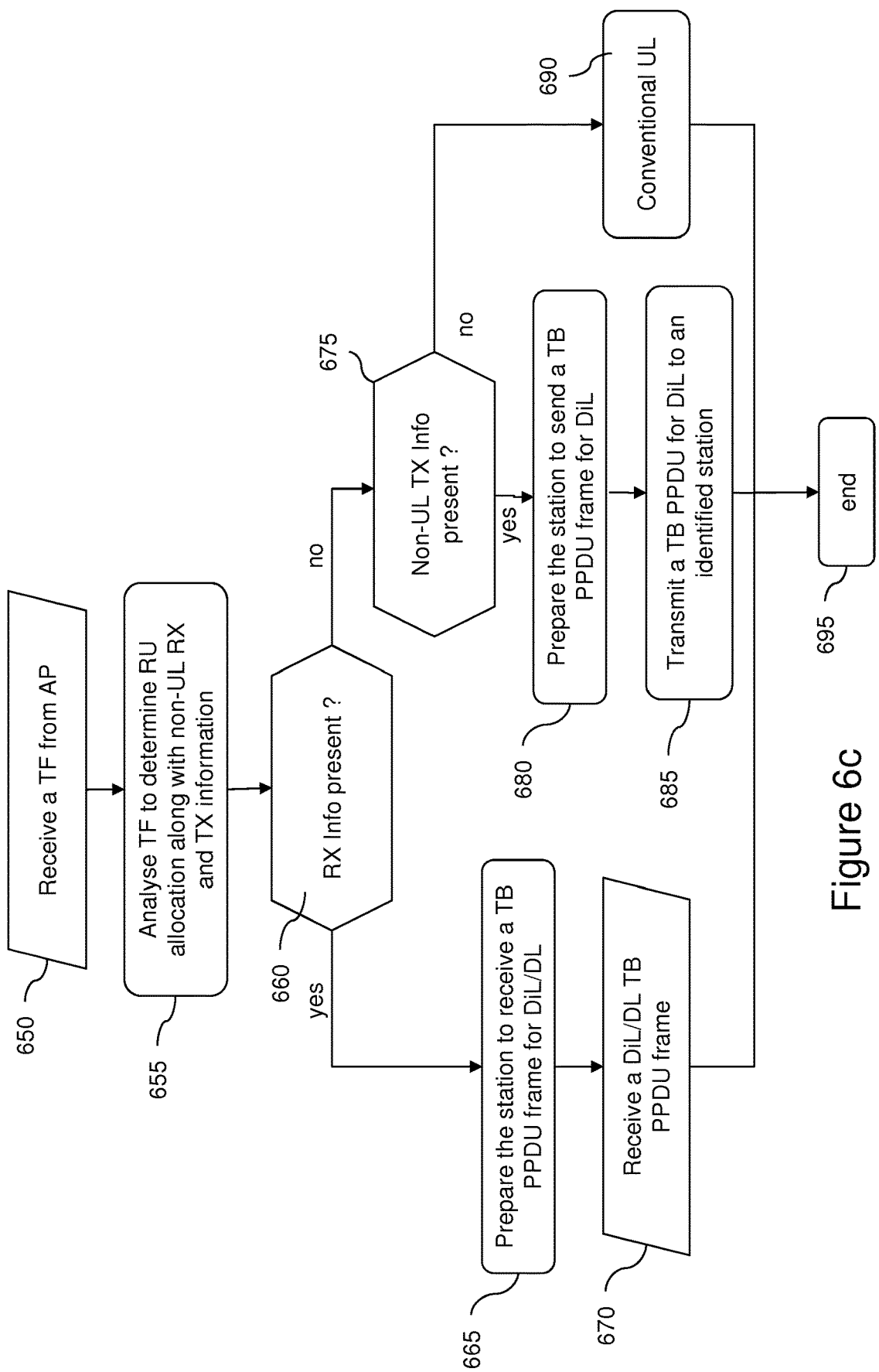
FIG. 6c illustrates, using a flowchart, operations performed at a non-AP station, according to various embodiments.

First, FIG. 6c illustrates, using a flowchart, general steps performed by a triggered (here non-AP) station.

At step 650, the non-AP station receives, from a triggering station, usually AP 110, trigger frame 510 triggering a multi-user, MU, transmission, wherein the trigger frame allocates a resource unit of the MU transmission for non-UL data transmission to the non-AP station.

At step 655, the non-AP station decodes the received trigger frame 510, and determines all RUs described in the trigger frame, identifying the non-AP station as a source station or a destination station for a non-UL (i.e. DiL or DL) RU declared in the trigger frame. The case of conventional Scheduled RU for uplink communication is not described here, as it can be handled in a conventional way.

This may be done by analyzing all User Info fields 310 declared in trigger frame 510, and more specifically by analyzing AID12 subfield 311, reserved bit B39 313 and/or Trigger Dependent User Info subfield 314 used by AP 110 to declare the DiL/DL RU with the destination non-AP station and, when required (for DiL), the source non-AP station. In variant to the use of AID to signal the stations involved in the RUs, their MAC addresses may be signaled.

An RU may be provided as a scheduled RU or a random RU (in which case the non-AP station has to contend for accessing it).

In an embodiment, at most one RU is eligible for (DL or DiL) reception for the non-AP station in the RU allocation list provided by trigger frame 510.

In an embodiment, at least one RU is eligible for (DiL) transmission for the non-AP station in the RU allocation list provided by trigger frame 510.

In an embodiment, such RU eligible for (DL or DiL) reception and RU eligible for (DiL) transmission are exclusive one to the other, in order the non-AP station either receive or transmit, but does not perform both at the same time.

If it is determined at step 660 that the non-AP station is the destination triggered station for a DiL/DL RU, the non-AP station thus prepares (665) itself to receive as described below with reference to FIG. 7c. It means responsive to the trigger frame, that the non-AP configures its Physical, PHY, layer in a receive state to receive one or more data frames over the resource unit (in response to the trigger frame).

It can then receive (670) one or more data frames over the determined DiL/DL resource unit. In case of DL transmission, the data frame is received from the AP, whereas in case of DiL transmission, it is received from another non-AP station.

If it is determined at steps 660 and 675 that the non-AP station is the source triggered station for a DiL RU, the non-AP station thus prepares (680) itself to send as described below with reference to FIG. 7d. It can then send (step 685) a data frame directly to the destination non-AP station (as specified in the trigger frame) using the DiL resource unit allocated for direct link transmission. Otherwise conventional UL transmission occurs (690) unless the non-station is not involved in any RU.

Then the process ends (695).

FIG. 7c illustrates the MAC/PHY exchanges along the branch of steps 665-670, i.e. DiL/DL receiving process at a non-AP station. The same reference as those of FIG. 4b correspond to the same steps (e.g. steps 450-455 of receiving trigger frame 510 with DiL/DL RU or RUs).

This Figure shows how the MAC/PHY interface configures the PHY 823 in a receive state to receive the DiL/DL data frames (TB PPDUs) intended to it.

At step 750, the MAC 824 having decoded trigger frame 510 determines from trigger frame 510 that a resource unit of the MU transmission is allocated for data transmission towards the non-AP station. This corresponds to steps 655-660.

Now, the non-AP station has to configure its PHY in particular to frequency filter only resource unit or units allocated for DiL/DL data transmission towards the non-AP station. However, the PHY is stateless (furthermore it has not decoded the trigger frame) and the TB PPDUs to be received do not have the HE-SIG-B field. Therefore, there is a need that the RU allocation to be considered by the PHY for next DiL/DL reception be provided to the PHY by the MAC. To that end, it is contemplated using the TRIGVECTOR (usually reserved at the AP) with its corresponding PHY-TRIGGER.request primitive, to perform such action at the non-AP station (providing the PHY with all information needed to demodulate the expected HE TB PPDU response, i.e. DiL/DL data).

Among others parameters, the TRIGVECTOR vector comprises an AID12_LIST list of resource units which identifies the resource unit allocated for DiL/DL data transmission towards the non-AP station.

In one embodiment, at most one RU is allocated to the non-AP station for DiL or DL reception in the RU allocation list provided by trigger frame 510. In that case, at most one DiL/DL RU is signalled in the TRIGVECTOR parameter set to configure the PHY for filtering this specific RU.

For instance, the AID12_LIST list of TRIGVECTOR may thus comprise a single entry which is the AID of the non-AP station, and the RU_ALLOCATION_LIST list of TRIGVECTOR may comprise a single entry which indicates the specific DiL/DL RU to be filter over which the expected TB PPDU shall be received. More generally, the TRIGVECTOR vector comprises an AID12_LIST list according to 802.11ax, which list comprises only a station identifier (AID) assigned to the non-AP station by the AP.

In a variant, the AID12_LIST list is set to an unsignificant value, i.e. an unused station identifier (AID) not assigned to a station by the AP. This is because the non-AP station will configure itself to only demodulate PPDU onto the RU frequency as specified in the RU_ALLOCATION_LIST list. A value of AID to be considered as unsignificant can be the value 0 or 2046.

As clearly apparent from the left side of the Figure, the non-AP station remains in receive state 499 all along the successive transmissions: trigger frame from the AP and then DiL/DL data from the AP or other peer non-AP station. This clearly modifies the convention Tx/Rx scheme where transmission follows reception (vice versa).

Once the PHY 823 of the non-AP station has received the TRIGVECTOR vector, it configures (460) itself in the same way as step 415 (performed by the AP) except that only one RU is configured for frequency filtering of the PHY receiving module.

The PHY of the non-AP station is ready to receive the HE TB PPDU response.

When such a TB PPDU frame is received, the PHY 823 demodulates it (765) and provides (770) the received PSDU bits (forming the DiL/DL data) to the MAC 824 using the same methods as for steps 420/425 or 450/455 above.

FIG. 7d illustrates the MAC/PHY exchanges along the branch of steps 680-685, i.e. DiL sending process at a non-AP station. The same reference as those of FIG. 4b correspond to the same steps (e.g. steps 450-455-765-470 including receiving trigger frame 510 with DiL RU). In this Figure, the non-AP station may have, in its MAC transmission buffers, UL data intended to the AP and DiL data intended for one or more other non-AP stations. The DiL data are labelled for DiL transmission in the buffers.

Upon receiving trigger frame 510, the MAC 824 of the non-AP station determines, from the trigger frame as received from the PHY, whether a RU is allocated to it for DiL transmission. It means the MAC 824 is able to make a distinction between an allocated RU that is for UL transmission (conventional approach) and an allocated RU that is for DiL transmission (according to some aspects of the invention).

In case of DiL allocated to the non-AP station, the MAC retrieves only (DiL) data labelled for DiL transmission, from its local MAC transmission buffers (UL data retrieval is conventional as explained with reference to FIG. 4b). In particular, it selects the appropriate amount of DiL data (given the length of the UL transmission as specified in trigger frame 510) from the MAC transmission buffers.

The next steps 465-470 are the same as in FIG. 4b except that DiL data are transmitted to the PHY so that the PHY layer sends only DiL-labelled data over the resource unit allocated for direct link transmission (transmission of UL data is as in FIG. 4b).

Figures 8A, 8B:
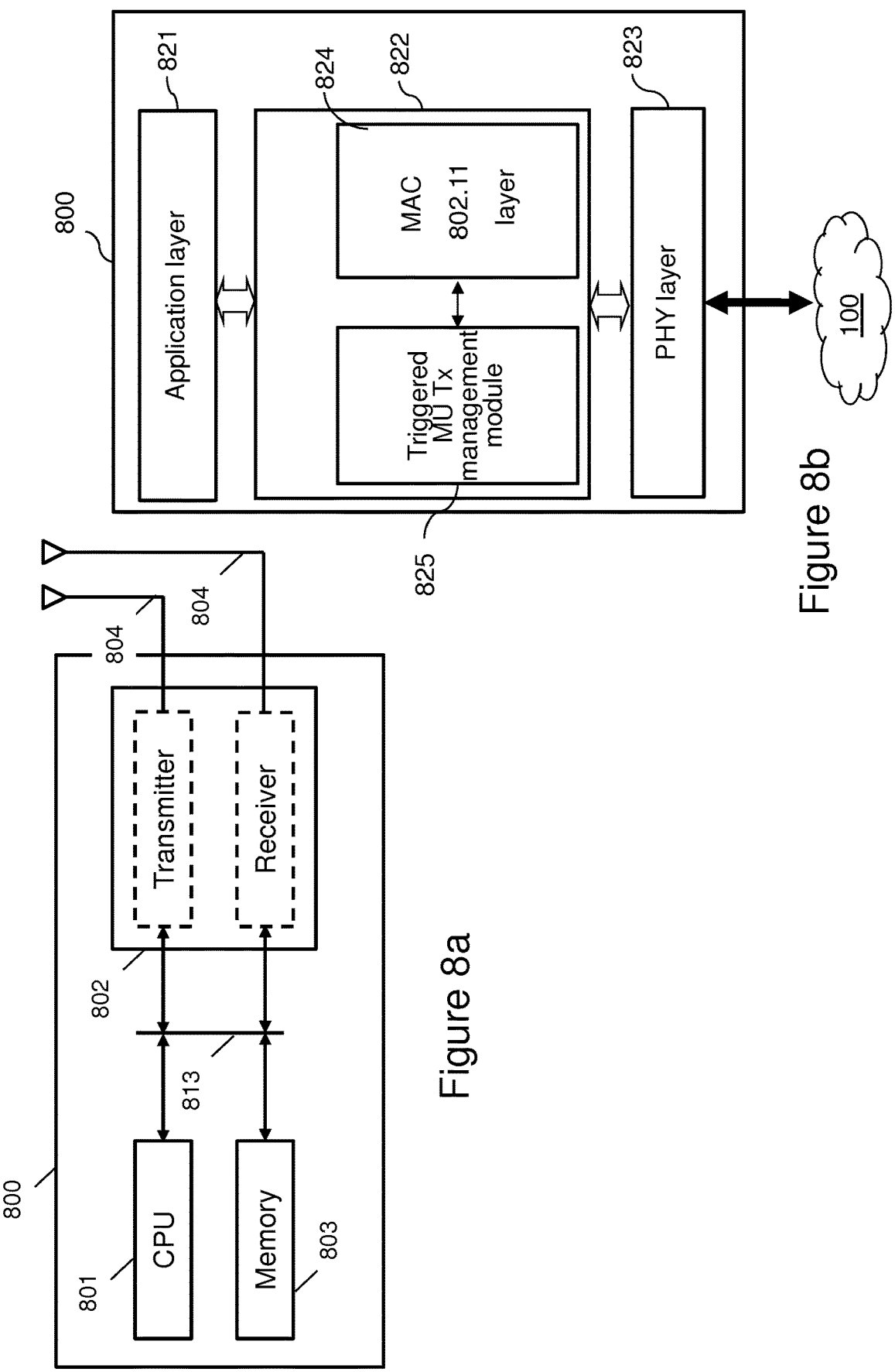
FIG. 8a shows a schematic representation a communication device in accordance with embodiments of the present invention.
FIG. 8b shows a schematic representation of a wireless communication device in accordance with embodiments of the present invention.

FIG. 8a schematically illustrates a communication device 800, either a non-AP station 101-107 or the access point 110, of the radio network 100, configured to implement at least one embodiment of the present invention. The communication device 800 may preferably be a device such as a micro-computer, a workstation or a light portable device. The communication device 800 comprises a communication bus 813 to which there are preferably connected:

a central processing unit 801, such as a processor, denoted CPU;

a memory 803 for storing an executable code of methods or steps of the methods according to embodiments of the invention as well as the registers adapted to record variables and parameters necessary for implementing the methods; and at least one communication interface 802 connected to a wireless communication network, for example a communication network according to one of the IEEE 802.11 family of standards, via transmitting and receiving antennas 804.

Preferably the communication bus provides communication and interoperability between the various elements included in the communication device 800 or connected to it. The representation of the bus is not limiting and in particular the central processing unit is operable to communicate instructions to any element of the communication device 800 directly or by means of another element of the communication device 800.

The executable code may be stored in a memory that may either be read only, a hard disk or on a removable digital medium such as for example a disk. According to an optional variant, the executable code of the programs can be received by means of the communication network, via the interface 802, in order to be stored in the memory of the communication device 800 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

FIG. 8b is a block diagram schematically illustrating the architecture of the communication device 800, either the AP 110 or one of stations 101-107, adapted to carry out, at least partially, the invention. As illustrated, device 800 comprises a physical (PHY) layer block 823, a MAC layer block 822, and an application layer block 821.

The PHY layer block 823 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 510 (FIG. 5) to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 822 preferably comprises a MAC 802.11 layer 824 implementing conventional 802.11ax MAC operations, and additional block 825 for carrying out, at least partially, the invention. The MAC layer block 822 may optionally be implemented in software, which software is loaded into RAM 803 and executed by CPU 801.

Preferably, the additional block 825, referred to as Triggered MU Tx management module for triggered MU transmissions following a medium access trigger frame through OFDMA resource units (sub-channels), implements the part of embodiments of the invention (either from station perspective or from AP perspective).

For instance and not exhaustively, the operations for the station (AP or non-AP) may include, at the AP, generating and sending a trigger frame allocating a RU for DiL or DL transmission, sending data frames to a destination triggered station using a DL RU, and at the triggered stations, receiving such a trigger frame, receiving such data frames from the AP over a DL RU, sending data frames to another triggered station over an allocated DiL RU, receiving data frames from another triggered station over an allocated DiL RU. The operations at the AP may also include updating the list of RUs to transmit to the PHY 824 in order to configure the latter for efficient filtering of the UL RUs only. The operations at the non-AP station may also include using the TRIGVECTOR to configure the PHY for reception over DiL/DL RUs when the non-AP station operates as a destination station of a DiL/DL transmission, and may also include retrieving only DiL data from the MAC transmissions buffer for transmission to the PHY when the non-AP station operates as a source station for a DiL transmission.

MAC 802.11 layer 824, Triggered MU Tx management module 825 interact one with the other in order to process accurately communications over OFDMA RU addressed to multiple stations according to embodiments of the invention.

On top of the Figure, application layer block 821 runs an application that generates and receives data packets, for example data packets such as a video stream. Application layer block 821 represents all the stack layers above MAC layer according to ISO standardization.

The present disclosure defines an enhanced MAC/PHY interface in order to handle Direct Link and/or Downlink transmissions in resource units triggered by a trigger frame. The new MAC/PHY interface advantageously uses the RXVECTOR, TXVECTOR and TRIGVECTOR vectors without modification of their parameters, but with new inventive unintended uses involving adapted values for the parameters. Therefore existing 802.11 chips implementing such vectors can still be used, with software update to implement the unintended uses.

Although the present invention has been described hereinabove with reference to specific embodiments, the present invention is not limited to the specific embodiments, and modifications will be apparent to a skilled person in the art which lie within the scope of the present invention.

For instance, although the description above indicates a non-AP station handles a single RU at a given time (either for transmission or reception), it may be contemplated having non-AP stations (and also APs) the capabilities of which allow simultaneous reception and transmission over separate RUs.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for wireless communication, at a Medium Access Control (MAC) layer of a triggered station as a first non-Access Point (AP) station, comprising:
   receiving a trigger frame from a triggering station as an AP, wherein the trigger frame triggers a multi-user (MU) transmission, wherein the trigger frame defines a plurality of resource units splitting a communication channel of the MU transmission and the trigger frame allocates a resource unit of the plurality of resource units of the MU transmission, wherein the resource unit is allocated to perform a direct data transmission from a second non-AP station towards the triggered station as the first non-AP station; and
   responsive to the trigger frame, performing a configuration of a Physical (PHY) layer of the triggered station in a receive state to receive one or more data units over the resource unit allocated by the triggered frame,
   wherein the MAClayer signals the resource unit, allocated by the trigger frame, in a parameter set to configure the PHY layer to filter the resource unit signaled by the MAC layer,
   wherein, in said configuration of the PHY layer the MAC layer delivers, to the PHY layer, the parameter set via an interface between the PHY layer and the MAC layer,
   wherein the parameter set provides the PHY layer with information needed to perform filtering and demodulating, and
   wherein the PHY layer performs i) filtering of the resource unit signaled by the MAC layer, and ii) demodulating of data units received onto the resource unit signaled by the MAC layer, while non-allocated resource unit of the plurality of resource units is not signaled in the parameter set.

2. The method of claim 1, further comprising, at the triggered station, receiving a data frame over the resource unit allocated by the trigger frame.

3. The method of claim 1, further comprising, at the MAC layer prior to configuring the PHY layer, determining from the trigger frame whether a resource unit of the MU transmission is allocated for data transmission towards the triggered station.

4. The method of claim 1, wherein configuring the PHY layer includes a frequency filtering of only resource unit or units allocated for data transmission towards the triggered station.

5. The method of claim 1, wherein, the interface between the PHY layer and the MAC layer is a TRIGVECTOR vector according to IEEE802.11 standard series.

6. The method of claim 5, wherein, the parameter set delivered via the TRIGVECTOR vector further comprises an AID12_LIST list according to IEEE802.11 standard series, which list comprises only an unused station identifier not assigned to a station by an access point.

7. A triggered station as a non-Access Point (AP) station in a wireless network comprising a microprocessor implementing a Medium Access Control (MAC) layer and being configured for carrying out the steps of:
   receiving a trigger frame from a triggering station as an AP, wherein the trigger frame triggers a multi-user (MU) transmission, wherein the trigger frame defines a plurality of resource units splitting a communication channel of the MU transmission and the trigger frame allocates a resource unit from the plurality of resource units of the MU transmission, wherein the resource unit is allocated to perform a direct data transmission from a second non AP station towards the triggered station as the first non AP station; and
   responsive to the trigger frame, performing a configuration of a Physical (PHY) layer of the triggered station in a receive state to receive one or more data units over the resource unit allocated by the trigger frame,
   wherein the MAClayer signals the resource unit, allocated by the trigger frame in a parameter set to configure the PHY layer to filter the resource unit signaled by the MAC layer,
   wherein, in said configuration of the PHY layer, the MAC layer delivers, to the PHY layer, the parameter set via an interface between the PHY layer and the MAC layer,
   wherein the parameter set provides the PHY layer with information needed to perform filtering and demodulating, and
   wherein, the PHY layer performs i) filtering of the resource unit signaled by the MAC layer, and ii) demodulating of data units received onto the resource unit signaled by the MAC layer, while non-allocated resource unit of the plurality of resource units is not signaled in the parameter set.

8. A non-transitory computer-readable medium storing a program which, when executed by a microprocessor or computer system in a device, causes the device to perform the method of claim 1.

* * * * *